United States Patent
Katami et al.

(10) Patent No.: US 12,398,296 B2
(45) Date of Patent: Aug. 26, 2025

(54) METHOD FOR PRODUCING PRESSURE-SENSITIVE ADHESIVE SHEET, AND PRESSURE-SENSITIVE ADHESIVE SHEET

(71) Applicant: NITTO DENKO CORPORATION, Ibaraki (JP)

(72) Inventors: Hirofumi Katami, Ibaraki (JP); Hirotaka Ohara, Ibaraki (JP); Shuhei Fukutomi, Ibaraki (JP); Shinya Yamamoto, Ibaraki (JP); Takahiro Nonaka, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 156 days.

(21) Appl. No.: 17/914,591

(22) PCT Filed: Mar. 24, 2021

(86) PCT No.: PCT/JP2021/012326
§ 371 (c)(1),
(2) Date: Sep. 26, 2022

(87) PCT Pub. No.: WO2021/193747
PCT Pub. Date: Sep. 30, 2021

(65) Prior Publication Data
US 2023/0203347 A1 Jun. 29, 2023

(30) Foreign Application Priority Data
Mar. 27, 2020 (JP) .................................. 2020-059016
Mar. 23, 2021 (JP) .................................. 2021-048552

(51) Int. Cl.
C09J 7/38 (2018.01)
B32B 7/12 (2006.01)
(Continued)

(52) U.S. Cl.
CPC ................... *C09J 7/38* (2018.01); *B32B 7/12* (2013.01); *B32B 27/18* (2013.01); *C09J 7/20* (2018.01);
(Continued)

(58) Field of Classification Search
CPC ....... C09J 7/38; C09J 7/20; C09J 11/02; C09J 2301/50; B32B 7/12; B32B 27/18; B32B 2307/412; B32B 2307/748
See application file for complete search history.

(56) References Cited

U.S. PATENT DOCUMENTS 6,762,508 B1 7/2004 Kiso et al.
10,072,184 B2 9/2018 Katami et al.
(Continued)

FOREIGN PATENT DOCUMENTS

CN 105190367 A 12/2015
EP 4 130 178 A1 2/2023
(Continued)

OTHER PUBLICATIONS

First Office Action dated Jan. 13, 2024 issued by The State Intellectual Property Office of People's Republic of China in CN Application No. 202180024679.6.
(Continued)

*Primary Examiner* — Daniel McNally
(74) *Attorney, Agent, or Firm* — Sughrue Mion, PLLC

(57) ABSTRACT

A method for producing a pressure-sensitive adhesive sheet according to the present invention includes: forming a pressure-sensitive adhesive layer 10 formed of a transparent base pressure-sensitive adhesive material on a support S; curing the pressure-sensitive adhesive layer 10; providing a solution 12 of an additive 11; applying the solution 12 to one of opposite surfaces of the cured pressure-sensitive adhesive layer 10a to cause the additive contained in the solution 12 to infiltrate from the one surface in a thickness direction of
(Continued)

the pressure-sensitive adhesive layer 10a; and drying the pressure-sensitive adhesive layer 10a.

9 Claims, 5 Drawing Sheets

(51) Int. Cl.
    *B32B 27/18*     (2006.01)
    *C09J 7/20*     (2018.01)
    *C09J 11/02*     (2006.01)

(52) U.S. Cl.
    CPC .......... *C09J 11/02* (2013.01); *B32B 2307/412* (2013.01); *B32B 2307/748* (2013.01); *C09J 2301/50* (2020.08)

(56) References Cited

U.S. PATENT DOCUMENTS

| | | |
|---|---|---|
| 2013/0321991 A1 | 12/2013 | Lee et al. |
| 2014/0079926 A1 | 3/2014 | Jeon et al. |
| 2016/0115357 A1* | 4/2016 | Katami .................. C09J 201/00 428/212 |
| 2017/0368786 A1 | 12/2017 | Katami et al. |

FOREIGN PATENT DOCUMENTS

| | | | |
|---|---|---|---|
| JP | 59-56471 A | | 3/1984 |
| JP | 59056471 A | * | 3/1984 |
| JP | 4-50351 B2 | | 8/1992 |
| JP | 8-170055 A | | 7/1996 |
| JP | 10-273634 A | | 10/1998 |
| JP | 2005-319774 A | | 11/2005 |
| JP | 2012-211305 A | | 11/2012 |
| JP | 2016-128537 A | | 7/2016 |
| JP | 2019-98659 A | | 6/2019 |
| WO | 2015/108160 A1 | | 7/2015 |
| WO | 2015/145767 A1 | | 4/2017 |
| WO | 2016/170875 A1 | | 9/2017 |

OTHER PUBLICATIONS

Extended European Search Report issued Aug. 22, 2023 in Application No. 21774851.6.
International Search Report for PCT/JP2021/012326 dated, Jun. 22, 2021 (PCT/ISA/210).
Notice of Reasons for Refusal dated Jun. 24, 2025 in Japanese Application No. 2021-048552.

* cited by examiner

[Fig. 3]
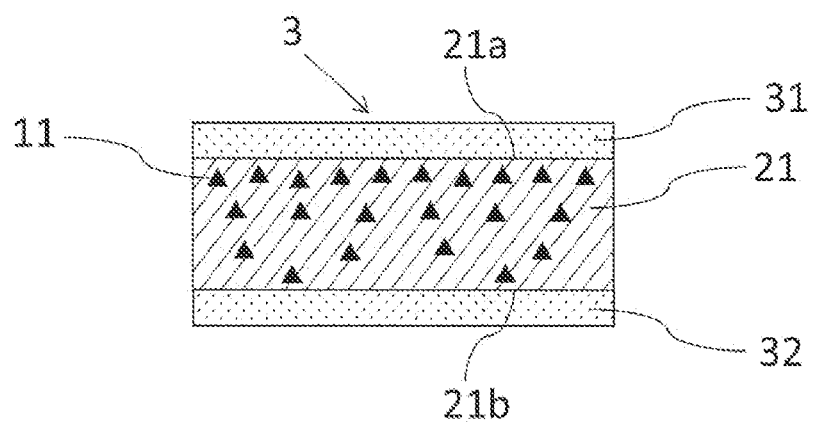

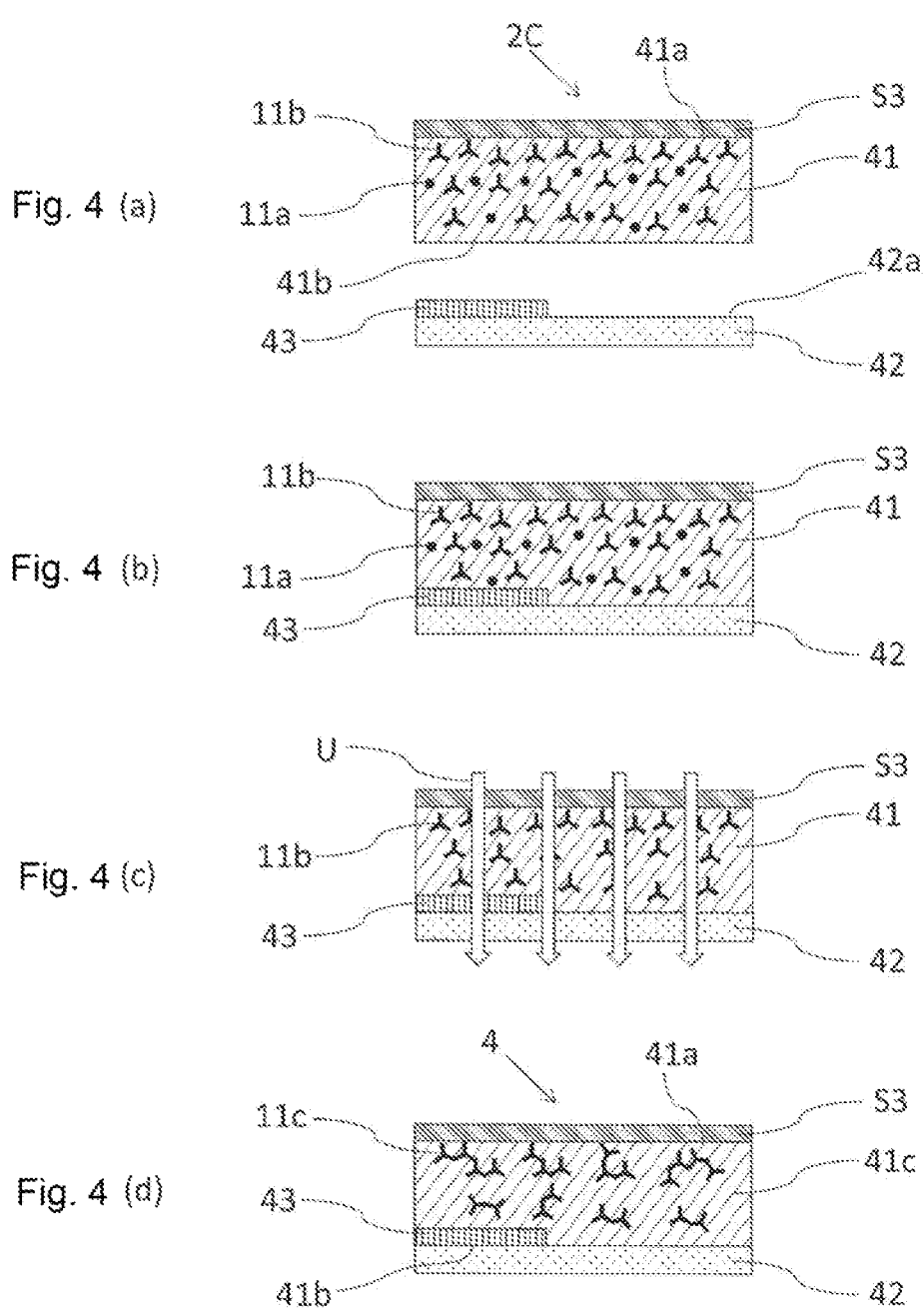

METHOD FOR PRODUCING PRESSURE-SENSITIVE ADHESIVE SHEET, AND PRESSURE-SENSITIVE ADHESIVE SHEET

CROSS REFERENCE TO RELATED APPLICATIONS

This application is a National Stage of International Application No. PCT/JP2021/012326 filed Mar. 24, 2021, claiming priority based on Japanese Patent Application No. 2020-059016 filed Mar. 27, 2020 and Japanese Patent Application No. 2021-048552 filed Mar. 23, 2021.

TECHNICAL FIELD

The present invention relates to a method for producing a pressure-sensitive adhesive sheet having a transparent pressure-sensitive adhesive layer, and a pressure-sensitive adhesive sheet that can be obtained by the production method. In particular, the present invention relates to a method for producing a pressure-sensitive adhesive sheet having a transparent pressure-sensitive adhesive layer that can be used for bonding a transparent optical element to another optical element, and a pressure-sensitive adhesive sheet that can be obtained by the production method.

BACKGROUND ART

An image display device, such as a liquid crystal display device or an organic EL display device, is composed of an optical element laminate in which one of various types of transparent optical elements, such as a polarizing film, a retardation film, and a transparent cover element including a cover glass, is laminated. An adhesive sheet comprising a transparent pressure-sensitive adhesive layer is used for bonding these optical elements to each other. In other words, a pressure-sensitive adhesive sheet is disposed between two optical elements to be bonded together, and then the two optical elements are pressed against each other, so that they are bonded together through the pressure-sensitive adhesive sheet to form an optical element laminate. A pressure-sensitive adhesive sheet provided with the pressure-sensitive adhesive layer on one side of a substrate film is generally used in production processes of an optical product as a surface protective film to prevent scratches or adherence of stain on the optical element.

The above pressure-sensitive adhesive sheet may contain various additives such as a polymerization initiator, a crosslinking agent, an ultraviolet absorbing agent, a rust inhibitor, and an antistatic agent according to required characteristics.

For example, in an image display device equipped with an input device such as a touch panel, a transparent electro-conductive printed layer, such as a patterned ITO (Indium Tin Oxide) layer, is formed on a surface of an optical element. Silver or copper lead wiring is further formed in the peripheral portion. In addition, a black concealing portion is generally printed in a frame shape in the peripheral edge portion of the transparent cover element. An adhesive sheet to which an optical element having such a printed layer and wiring is bonded is required to increase the fluidity of the pressure-sensitive adhesive layer to exhibit level difference absorbability such that no bubbles are left in the printed stepped space.

On the other hand, a plastic film or the like used as an optical element contains a gas such as carbon dioxide, and gas may be generated under high-temperature conditions in the production process. At this point, when the pressure-sensitive adhesive layer is soft, the gas generation cannot be suppressed enough, and the pressure-sensitive adhesive layer is floated, thus causing a problem that bubbles are likely to be formed. Therefore, in order to suppress the gas generation from the plastic film, the adhesive sheet is required to have a high elastic modulus of the pressure-sensitive adhesive layer and be hard to enhance adhesive reliability.

A pressure-sensitive adhesive sheet containing a hybrid pressure-sensitive adhesive (sometimes referred to herein as "hybrid pressure-sensitive adhesive sheet") is widely used as a pressure-sensitive adhesive sheet exhibiting both above level difference absorbability and adhesive reliability (see, for example, Patent Literature 1). The hybrid pressure-sensitive adhesive is a pressure-sensitive adhesive composition in which two polymerization initiators or crosslinking agents (sometimes referred to herein as "triggers") with different curing initiation conditions such as heat and light are incorporated to cure in stages. The hybrid pressure-sensitive adhesive sheet has the advantage that one of the triggers (sometimes referred to herein as "first trigger") first makes it semi-cured with high fluidity and excellent level difference absorbability to sufficiently follow the stepped space, and then the other trigger (sometimes referred to herein as the "second trigger") completes the curing process to improve adhesive reliability.

In addition, an image display device may be sometimes required to have ultraviolet protection properties to prevent deterioration of components and other parts in the image display device due to incident ultraviolet rays. In particular, an organic EL display device deteriorates more quickly due to ultraviolet rays than a liquid crystal display because organic compounds are used as light-emitting elements. Furthermore, as optical elements such as polarizing films and protective films become thinner, their light resistance to ultraviolet rays has decreased, making it essential to provide an ultraviolet absorbing layer. For example, it is known to use a pressure-sensitive adhesive sheet comprising an ultraviolet absorbing layer containing an ultraviolet absorbing agent (see, for example, Patent Literature 2).

In addition, as sensors in image displays and input devices become larger and have narrower frames, there is an increasing number of cases in which the devices are equipped with copper wiring. Although copper has excellent electrical conductivity and is a useful material for wiring, it is prone to oxidation and corrosion. In order to suppress oxidation and corrosion of copper wiring, it is known that the pressure-sensitive adhesive sheet is blended with a rust inhibitor (see, for example, Patent Literature 3).

There is also concern that static electricity generated when peeling a surface protection film from an optical element such as a polarizing film may damage the electrical circuits of the image display device. Static electricity can also be a factor that attracts dust and reduces workability. For example, it is known that an antistatic agent is incorporated into the pressure-sensitive adhesive layer in order to prevent the generation of static electricity by the surface protection film (see, for example, Patent Literature 4).

CITATION LIST

Patent Literature

Patent Literature 1: International Publication No. WO 2016/170875

Patent Literature 2: Japanese Patent Laid-Open No. 2012-211305

Patent Literature 3: International Publication No. WO 2015/145767

Patent Literature 4: Japanese Patent Laid-Open No. 2016-128537

SUMMARY OF INVENTION

Technical Problem

When the above various additives are incorporated into a pressure-sensitive adhesive sheet, they may affect various physical properties of the pressure-sensitive adhesive sheet, such as adhesive strength and elastic modulus. In particular, as image display devices have become lighter and thinner in recent years, the pressure-sensitive adhesive layer has also become thinner, and there is a growing demand to increase the concentration of additives contained in the pressure-sensitive adhesive sheet to meet the required characteristics. There is also a growing demand to blend two or more additives to impart multiple functions to the pressure-sensitive adhesive sheet, but there are cases where the additives interfere with each other, resulting in a trade-off relationship. Thus, problems associated with incorporating various additives into the pressure-sensitive adhesive sheet are becoming more apparent.

With such a background, when additives are incorporated into a pressure-sensitive adhesive sheet, it is becoming necessary to start the design from the beginning, for example, an amount of various additives blended, a pressure-sensitive adhesive composition such as a monomer composition of the base polymer, the thickness of the pressure-sensitive adhesive sheet, and curing conditions, in order to reduce changes in physical properties such as adhesive strength and elastic modulus of the pressure-sensitive adhesive sheet and interference among the additives, in addition to satisfying required characteristics by the additives. Furthermore, in order to achieve both the required characteristics by the additives and the physical properties of the pressure-sensitive adhesive sheet, there is another problem of narrowing the degree of freedom in design, for example, an additive selection and curing conditions.

For example, in a hybrid pressure-sensitive adhesive composition, two triggers with different curing conditions are used in combination. Since the combination of the triggers and strict setting of the curing conditions are necessary to prevent the curing reaction by the second trigger from progressing with the first trigger, there is a problem that the degree of freedom in the design, for example, the trigger selection and curing conditions, is extremely limited.

For example, when the first trigger is a thermopolymerization initiator and the second trigger is a photopolymerization initiator, the curing of the second trigger may progress during the thermal curing of the first trigger. Thus, strict control of the curing reaction is required. There is also the problem that thick pressure-sensitive adhesive layers take longer to thermally cure, resulting in lower production efficiency.

When the first trigger is a photopolymerization initiator and the second trigger is a thermopolymerization initiator, it is less practical because process control is required to avoid exposure to high temperatures in a step after light curing, and it is also difficult to heat the pressure-sensitive adhesive sheets after laminating them together.

When the first and second triggers are both photopolymerization initiators, the light absorbing wavelength bands of the two photopolymerization initiators need to be sufficiently separated. Furthermore, when the above ultraviolet absorbing agent is further incorporated, it is necessary to distinguish the wavelength band from that of the ultraviolet absorbing agent as well, resulting in extremely limited design possibilities.

When the first and second triggers are both thermopolymerization initiators, it is difficult to make the curing reaction a two-step curing reaction since the second trigger will inevitably progress during the thermal curing of the first trigger.

There is also a problem that the physical properties and curability of the pressure-sensitive adhesive are affected by incorporating a sufficient amount of an ultraviolet absorbing agent to impart ultraviolet protection properties to the pressure-sensitive adhesive composition. In particular, when light-cured pressure-sensitive adhesive sheets blended with ultraviolet absorbing agents are cured by ultraviolet irradiation, there is a problem that the ultraviolet rays are absorbed by the ultraviolet absorbing agents, resulting in deteriorated curability and reduced productivity.

Moreover, with a light-cured pressure-sensitive adhesive sheet blended with ultraviolet absorbing agents, there is also the problem of differences in physical properties such as adhesion and viscoelasticity between the front and back of the pressure-sensitive adhesive sheet. This is because the ultraviolet rays are absorbed by the ultraviolet absorbing agents while passing through the inside of the pressure-sensitive adhesive layer; and the deeper from the surface on the ultraviolet irradiated side, the lower the ultraviolet illuminance, resulting in a difference in the curing speed on the front and back thereof.

In the above patent literature, additives are incorporated into the pressure-sensitive adhesive composition and uniformly dissolved, but rust inhibitors and antistatic agents essentially function only near the interface with an optical element to be bonded. However, there was a dilemma in that it was necessary to incorporate additives throughout the pressure-sensitive adhesive layer to impart sufficient antirust and antistatic functions to the surface of the pressure-sensitive adhesive sheet, which in turn affect the physical properties of the pressure-sensitive adhesive sheet and other properties.

The present invention has been made under the circumstances described above, and an object thereof is to provide a method for producing a pressure-sensitive adhesive sheet, wherein even in the case of incorporating additives into a pressure-sensitive adhesive sheet, a change in physical properties of the pressure-sensitive adhesive sheet and interference between the additives are minimized while a degree of freedom in design, for example, an additive selection and curing conditions, increases to make the pressure-sensitive adhesive sheet easy to design.

Another object of the present invention is to provide a pressure-sensitive adhesive sheet, wherein even in the case of incorporating additives into a pressure-sensitive adhesive sheet, a change in physical properties of the pressure-sensitive adhesive sheet and interference between the additives are minimized while a degree of freedom in design, for example, an additive selection and curing conditions, increases to make the pressure-sensitive adhesive sheet easy to design.

Solution to Problems

As a result of intensive studies to achieve the object, the present inventors have found that a pressure-sensitive adhesive sheet having excellent physical properties of a pressure-sensitive adhesive layer and exhibiting excellent required characteristics by an additive is obtained by applying a solution of the additive after curing the pressure-sensitive adhesive layer of the pressure-sensitive adhesive sheet and causing it to infiltrate to minimize the influence on the physical properties of the pressure-sensitive adhesive layer and interference between additives. They have also found that the degree of freedom in design, for example, the additive selection and curing conditions, is dramatically improved. The present invention has been completed based on these findings.

In other words, the first aspect of the present invention provides a method for producing a pressure-sensitive adhesive sheet, comprising:

forming a pressure-sensitive adhesive layer formed of a transparent base pressure-sensitive adhesive material on a support;

curing the pressure-sensitive adhesive layer;

providing a solution of an additive;

applying the solution to one of opposite surfaces of the cured pressure-sensitive adhesive layer to cause the additive contained in the solution to infiltrate from the one surface in a thickness direction of the pressure-sensitive adhesive layer; and drying the pressure-sensitive adhesive layer.

The influence of the additive on the pressure-sensitive adhesive layer can be reduced by curing the pressure-sensitive adhesive layer before containing the additive in the pressure-sensitive adhesive layer. Therefore, a change in the physical properties of the pressure-sensitive adhesive layer due to the additive can be minimized.

A solution of the additive is applied to the pressure-sensitive adhesive layer after curing to cause the additive to infiltrate the pressure-sensitive adhesive layer. In this way, the required characteristics by the additive can be imparted to the pressure-sensitive adhesive layer. In addition, the transparency of the pressure-sensitive adhesive layer is maintained by the infiltration of the additive in a solution form.

Thereafter, the pressure-sensitive adhesive layer is dried by, for example, heating. This step allows the pressure-sensitive adhesive layer to return to a state close to that before application. In other words, since the pressure-sensitive adhesive layer is once cured, physical properties such as adhesive strength and elastic modulus are restored to a state close to that before the application of the solution.

Since the adhesive layer is cured before the additive is added thereto, once a composition, curing conditions, and physical properties of an adhesive composition have been determined, there is no need to redesign the composition due to the incorporation of an additive, and the thickness of the pressure-sensitive adhesive layer can be easily changed. Then, it is possible to control the required characteristics imparted to the pressure-sensitive adhesive layer by changing the coating conditions of the additive solution afterward. Thus, since the control of the physical properties of the pressure-sensitive adhesive layer can be separated from the control of the required characteristics by the additive, there is no need to design the pressure-sensitive adhesive layer from the beginning with respect to changes in the thickness of the pressure-sensitive adhesive layer or the amount of the additive added, and its efficiency is high.

In the method for producing a pressure-sensitive adhesive sheet according to the first aspect of the present invention, the solution of the additive may be a solution in which the additive is dissolved in a solvent, and may include evaporating the solvent of the solution by drying the pressure-sensitive adhesive layer.

By applying a solution of an additive dissolved in a solvent to the pressure-sensitive adhesive layer after curing, the solvent infiltrates the pressure-sensitive adhesive layer to cause the pressure-sensitive adhesive layer to swell, and the additive dissolved in the solvent infiltrates the pressure-sensitive adhesive layer that has been swollen by the solvent. This allows the required characteristics by the additive to be imparted to the pressure-sensitive adhesive layer, and the transparency of the pressure-sensitive adhesive layer is maintained as the additive is infiltrated by the solution.

The solvent that has infiltrated the pressure-sensitive adhesive layer evaporates by, for example, heating, and the pressure-sensitive adhesive layer returns to a state close to that before swelling. In other words, since the pressure-sensitive adhesive layer is once cured, physical properties such as adhesive strength and elastic modulus are restored to a state close to that before the application of the solution.

For example, by applying two or more solutions of additives separately to the pressure-sensitive adhesive layer and drying them, interference between additives can also be reduced and various required characteristics can be efficiently imparted.

The method for producing a pressure-sensitive adhesive sheet according to the first aspect of the present invention may further comprise laminating a release sheet onto a surface of the pressure-sensitive adhesive layer on a side opposite to the support. It is preferable that the pressure-sensitive adhesive layer surface can be protected by laminating a release sheet.

In the method for producing a pressure-sensitive adhesive sheet according to the first aspect of the present invention, the additive may be at least one selected from the group consisting of a polymerization initiator, a crosslinking agent, an ultraviolet absorbing agent, a rust inhibitor, and an antistatic agent. These additives are suitable examples to provide predetermined effects of the present invention.

When the additive is at least one selected from a polymerization initiator and a crosslinking agent, the first aspect of the present invention is useful as a method for producing a hybrid pressure-sensitive adhesive sheet.

When the first aspect of the present invention is the method for producing a hybrid pressure-sensitive adhesive sheet, the base pressure-sensitive adhesive material preferably contains a first polymerization initiator and a first crosslinking agent as a first trigger;

the curing is preferably curing by a reaction between the first polymerization initiator and the first crosslinking agent; and the additive is preferably at least one selected from the group consisting of a second polymerization initiator and a second crosslinking agent as a second trigger.

The first polymerization initiator may also be the same as the second polymerization initiator.

Since the curing reaction by the first trigger is completed before the addition of the second trigger, it is not necessary to combine the first trigger or set strict curing conditions that would prevent the curing reaction by the second trigger from progressing, and thus the degree of freedom in designing a hybrid pressure-sensitive adhesive sheet is dramatically improved.

In other words, since curing reactions of the first and second triggers are separated, the degree of freedom in selecting the combination of the first and the second triggers is extremely wide. For example, combinations of photopolymerization initiators for both the first and second triggers, combinations of a thermopolymerization initiator for the first trigger and a photopolymerization initiator for the second trigger, combinations of a photopolymerization initiator for the first trigger and a thermopolymerization initiator for the second trigger, etc., can be freely selected. In addition, it is also possible to use a combination of thermopolymerization initiators for both the first and second triggers, which has been difficult with conventional hybrid pressure-sensitive adhesive sheets. In the case of the combinations of photopolymerization initiators for both the first and second triggers, light absorption wavelength bands of the two photopolymerization initiators can overlap or approximate each other.

It is also possible to use a combination of the same polymerization initiator (regardless of whether it is a thermopolymerization initiator or photopolymerization initiator) as the first and second triggers, which had been impossible with conventional hybrid pressure-sensitive adhesive sheets.

Thus, the extremely high degree of freedom in the combination of the first and second triggers and the possibility of combining identical triggers are also suitable for avoiding the use of polymerization initiators that may cause coloration and degradation of the pressure-sensitive adhesive layer.

Moreover, since the curing reactions of the first and second triggers are separated and do not interfere with each other, there is no need to set strict conditions to control the respective curing reactions. For example, it is not necessary to set conditions for the first trigger that prevent the second trigger from progressing. Once the curing conditions capable of imparting excellent level difference absorbability to the pressure-sensitive adhesive layer are determined, the adhesive reliability to be imparted to the pressure-sensitive adhesive layer can be easily controlled by changing the coating and curing conditions for the second trigger solution afterward.

In the first aspect of the present invention, when the additive is an ultraviolet absorbing agent, the pressure-sensitive adhesive layer can be cured without being affected by the ultraviolet absorbing agent by irradiating the pressure-sensitive adhesive layer with ultraviolet rays before adding the ultraviolet absorbing agent thereto. Therefore, changes in the physical properties of the pressure-sensitive adhesive layer, such as a drop in productivity due to deterioration in curability caused by an ultraviolet absorbing agent and differences in physical properties between the front and back, can be minimized.

Since the adhesive layer is cured before the ultraviolet absorbing agent is added thereto, once the composition, curing conditions, and physical properties of an adhesive composition have been determined, there is no need to redesign the composition due to the incorporation of the ultraviolet absorbing agent, and the thickness of the pressure-sensitive adhesive layer can be easily changed. Then, it is possible to control the ultraviolet absorbing function imparted to the pressure-sensitive adhesive layer by changing the coating conditions of the ultraviolet absorbing agent solution afterward. Thus, since the control of the physical properties of the pressure-sensitive adhesive layer can be separated from the control of the ultraviolet absorbing function, there is no need to design the pressure-sensitive adhesive layer from the beginning with respect to changes in the thickness of the pressure-sensitive adhesive layer or the ultraviolet absorbing function, and its efficiency is high.

For example, when a hybrid pressure-sensitive adhesive sheet is blended with an ultraviolet absorbing agent, the ultraviolet absorbing agent can be added after curing by the first and second triggers, so there is no need to distinguish the absorption wavelength bands of the photopolymerization initiator and the ultraviolet absorbing agent to be used as the first and second triggers. Therefore, the degree of freedom in selecting the combination of the photopolymerization initiator and the ultraviolet absorbing agent is also dramatically improved.

In the first aspect of the present invention, when the additive is at least one selected from a polymerization initiator and a crosslinking agent, the additive also preferably contains an ultraviolet absorbing agent. When the additive contains an ultraviolet absorbing agent in addition to at least one selected from a polymerization initiator and a crosslinking agent, a hybrid pressure-sensitive adhesive sheet containing the ultraviolet absorbing agent can be produced in a single coating, thereby improving production efficiency. The additive is even more preferable because if a hybrid pressure-sensitive adhesive sheet containing an ultraviolet absorbing agent is irradiated with ultraviolet rays, the ultraviolet absorbing agent that has absorbed the ultraviolet rays generates heat, which accelerates the curing reaction and thus improves adhesive reliability.

In the first aspect of the present invention, when the additive is a rust inhibitor or antistatic agent, sufficient antirust or antistatic function can be imparted near the surface of the pressure-sensitive adhesive layer by applying a solution of the rust inhibitor or antistatic agent to the surface of the pressure-sensitive adhesive layer after curing to cause it to infiltrate. Since there is no need to uniformly disperse the rust inhibitor or the antistatic agent in the pressure-sensitive adhesive layer, the change in the physical properties, such as elastic modulus, of the pressure-sensitive adhesive layer due to the rust inhibitor or antistatic agent can be minimized, and the amount of the rust inhibitor or antistatic agent used can also be reduced.

Since the adhesive layer is cured before a rust inhibitor or an antistatic agent is added thereto, once the composition, curing conditions, and physical properties of an adhesive composition have been determined, there is no need to redesign the composition due to the incorporation of the rust inhibitor or antistatic agent and the thickness of the pressure-sensitive adhesive layer can also be easily changed. Then, it is possible to control the antirust or antistatic function imparted to the pressure-sensitive adhesive layer by changing the coating conditions of a solution of the rust inhibitor or antistatic agent afterward. Thus, since the control of the physical properties of the pressure-sensitive adhesive layer can be separated from the control of the antirust or antistatic function by the rust inhibitor and antistatic agent, there is no need to design the pressure-sensitive adhesive layer from the beginning with respect to changes in the thickness of the pressure-sensitive adhesive layer or the amount of the rust inhibitor or antistatic agent added, and its efficiency is high.

The second aspect of the present invention also provides a method for producing an optical element laminate,
    the optical element laminate comprising a substrate comprising an optical element and a pressure-sensitive adhesive layer, the method comprising:
    bonding a pressure-sensitive adhesive layer of a pressure-sensitive adhesive sheet obtained by the method for producing a hybrid pressure-sensitive adhesive sheet according to the first aspect of the present invention to a principal surface of the substrate comprising an optical element; and curing the pressure-sensitive adhesive layer by reaction of at least one selected from the group consisting of the second polymerization initiator and the second crosslinking agent.

In the method for producing the optical element laminate according to the second aspect of the present invention, the principal surface of the substrate comprising an optical element has a printed layer; and the pressure-sensitive adhesive layer is preferably bonded so as to fill up a stepped space between the principal surface of the substrate comprising an optical element and the printed layer.

The second aspect of the present invention is a method for producing an optical element laminate using a pressure-sensitive adhesive sheet (hybrid pressure-sensitive adhesive sheet) obtained by the method for producing the hybrid pressure-sensitive adhesive sheet according to the first aspect of the present invention.

The pressure-sensitive adhesive layer of the hybrid pressure-sensitive adhesive sheet used in the second aspect of the present invention is cured by a first polymerization initiator and a first crosslinking agent (first trigger) but is in a semi-cured and highly fluid state before the curing by at least one selected from the group consisting of a second polymerization initiator and a second crosslinking agent (second trigger). Therefore, even when the principal surface of the substrate comprising an optical element has a printed layer, the pressure-sensitive adhesive layer can sufficiently follow a stepped space between the principal surface of the substrate comprising an optical element and the printed layer and can be bonded so as to fill up this.

Next, the pressure-sensitive adhesive layer is cured by the reaction of at least one selected from the group consisting of the second polymerization initiator and the second crosslinking agent (second trigger) to increase the elastic modulus of the pressure-sensitive adhesive layer, thereby improving the adhesive reliability.

The third aspect of the present invention also provides:

a pressure-sensitive adhesive sheet having a support and a transparent pressure-sensitive adhesive layer on the support, wherein:

the pressure-sensitive adhesive layer is a single layer comprising a transparent base pressure-sensitive adhesive material and having two opposite principal surfaces;

an additive is dissolved in the pressure-sensitive adhesive layer; and in a case where the single pressure-sensitive adhesive layer is divided into two equal portions in a thickness direction, a concentration of the additive in an area to which one of the two principal surfaces, a first principal surface, belongs is different from a concentration of the additive in an area to which the other principal surface, a second principal surface, belongs.

The pressure-sensitive adhesive sheet according to the third aspect of the present invention can be obtained by the method for producing the pressure-sensitive adhesive sheet according to the first aspect of the present invention. By applying a solution of additives onto one of opposite surfaces of the pressure-sensitive adhesive layer to cause it to infiltrate, a concentration difference of the additives may occur on the front and back of the pressure-sensitive adhesive layer. The pressure-sensitive adhesive sheet in which this configuration may occur can minimize a change in physical properties due to additives, as described above.

Note that in the method for producing a pressure-sensitive adhesive sheet according to the first aspect of the present invention, the concentration of the additive may be the same or substantially the same on the front and back of the pressure-sensitive adhesive layer, depending on conditions such as the thickness of the pressure-sensitive adhesive layer and the infiltration time of the additive. Therefore, the present invention also includes a case where a pressure-sensitive adhesive sheet having the same or substantially the same additive concentration on the front and back of the pressure-sensitive adhesive layer is obtained by the method for producing a pressure-sensitive adhesive sheet according to the first aspect of the present invention.

In the pressure-sensitive adhesive sheet according to the third aspect of the present invention, the pressure-sensitive adhesive layer is preferably a cured pressure-sensitive adhesive layer. This configuration is preferable in that a change in physical properties due to additives can be minimized.

In the pressure-sensitive adhesive sheet according to the third aspect of the present invention, the second principal surface faces the support, and the concentration of the additive in the area to which the first principal surface belongs is preferably higher than the concentration of the additive in the area to which the second principal surface belongs. This configuration may be obtained by applying a solution of the additive to the first principal surface.

In the pressure-sensitive adhesive sheet according to the third aspect of the present invention, the single pressure-sensitive adhesive layer preferably has a concentration gradient of the additive in the thickness direction. This configuration may be obtained by applying a solution of the additive to one of opposite principal surfaces of the pressure-sensitive adhesive layer.

In the pressure-sensitive adhesive sheet according to the third aspect of the present invention, the support is preferably a release sheet. In this case, the support being the release sheet is preferably disposed on each of both surfaces of the pressure-sensitive adhesive layer. It is preferable in that the support being a release sheet can be bonded to a transparent optical element after being removed.

In the pressure-sensitive adhesive sheet according to the third aspect of the present invention, the additive is preferably at least one selected from the group consisting of a polymerization initiator, a crosslinking agent, an ultraviolet absorbing agent, a rust inhibitor, and an antistatic agent. These additives are suitable examples to provide predetermined effects of the present invention.

When the additive is at least one selected from the group consisting of a polymerization initiator and a crosslinking agent, the third aspect of the present invention is useful as a hybrid pressure-sensitive adhesive sheet.

In the third aspect of the present invention, when the additive is at least one selected from a polymerization initiator and a crosslinking agent, the additive also preferably contains an ultraviolet absorbing agent. When the additive contains an ultraviolet absorbing agent in addition to at least one selected from a polymerization initiator and a crosslinking agent, the pressure-sensitive adhesive sheet according to the third aspect of the present invention may be a hybrid pressure-sensitive adhesive sheet containing the ultraviolet absorbing agent. The additive is preferable in that if a hybrid pressure-sensitive adhesive sheet containing an ultraviolet absorbing agent is irradiated with ultraviolet rays, the ultraviolet absorbing agent that has absorbed the ultraviolet rays generates heat, which accelerates the curing reaction and thus improves adhesive reliability.

When the third aspect of the present invention is a hybrid pressure-sensitive adhesive sheet, the base pressure-sensitive adhesive material preferably contains a first polymerization initiator and a first crosslinking agent as a first trigger;

the curing is curing by a reaction between the first polymerization initiator and the first crosslinking agent; and the additive is preferably at least one selected from the group consisting of a second polymerization initiator and a second crosslinking agent as a second trigger.

The first polymerization initiator may also be the same as the second polymerization initiator.

When the third aspect of the present invention is a hybrid pressure-sensitive adhesive sheet, the same effect can be attained as when the first aspect of the present invention is a method for producing a hybrid pressure-sensitive adhesive sheet.

The concentration of the second trigger in the area to which the first principal surface belongs is different from the concentration of the second trigger in the area to which the second principal surface belongs, making it possible to control the crosslinking density of the first principal surface and the second principal surface and to differentiate physical properties such as elastic modulus on the front and back of the pressure-sensitive adhesive layer. This configuration is suitable, for example, in a bendable, flexible display. When a flexible display is bent, tensile stress is generally applied to the outside while compressive stress is applied to the inside, with the outside stress being greater than the inside stress. Therefore, durability against bending can be improved by disposing the surface with a higher concentration of the second trigger of the pressure-sensitive adhesive layer on the outside of the flexible display when it is bent.

When the additive in the third aspect of the present invention is an ultraviolet absorbing agent, the same effect can be attained when the additive is an ultraviolet absorbing agent in the method for producing the pressure-sensitive adhesive sheet according to the first aspect of the present invention. In other words, the pressure-sensitive adhesive sheet according to the third aspect of the present invention, in which the additive is an ultraviolet absorbing agent, can minimize changes in the physical properties, such as a drop in productivity due to deterioration in curability caused by an ultraviolet absorbing agent and differences in physical properties between the front and back.

When the additive in the pressure-sensitive adhesive sheet according to the third aspect of the present invention is a rust inhibitor or an antistatic agent, the same effect can be attained when the additive is a rust inhibitor or an antistatic agent in the method for producing a pressure-sensitive adhesive sheet according to the first aspect of the present invention. In other words, the pressure-sensitive adhesive sheet according to the third aspect of the present invention, in which the additive is a rust inhibitor or an antistatic agent, can impart an excellent antirust function or antistatic function to one of opposite surfaces of the principal surface (first or second principal surface) by distributing the rust inhibitor or antistatic agent in a higher concentration onto the principal surface. Since there is no need to uniformly disperse the rust inhibitor or the antistatic agent in the pressure-sensitive adhesive layer, the change in the physical properties of the pressure-sensitive adhesive layer due to the rust inhibitor or antistatic agent can be minimized, and the amount of the rust inhibitor or antistatic agent used can also be reduced.

In the pressure-sensitive adhesive sheet according to the third aspect of the present invention, the thickness of the pressure-sensitive adhesive layer is preferably 5 μm to 500 μm. If the thickness of the pressure-sensitive adhesive layer is in this range, it is preferable to form a concentration gradient of the additives in the thickness direction of the pressure-sensitive adhesive layer. The thickness of the pressure-sensitive adhesive layer is more preferably 5 μm to 400 μm and even more preferably 5 μm to 350 μm.

The fourth aspect of the present invention also provides an optical element laminate comprising:

a substrate comprising an optical element; and a pressure-sensitive adhesive layer, wherein:

the pressure-sensitive adhesive layer is laminated on a principal surface of the substrate comprising an optical element; and the pressure-sensitive adhesive layer is a cured product of the pressure-sensitive adhesive layer of the hybrid pressure-sensitive adhesive sheet according to the third aspect of the present invention.

In the fourth aspect of the present invention, the principal surface of the substrate comprising an optical element has a printed layer, and the pressure-sensitive adhesive layer is preferably laminated so as to fill up a stepped space between the principal surface of the substrate comprising an optical element and the printed layer.

Moreover, in the fourth aspect of the present invention, the cured product is a cured product obtained by reaction of at least one selected from the group consisting of the second polymerization initiator and the second crosslinking agent.

The fourth aspect of the present invention is an optical element laminate using the hybrid pressure-sensitive adhesive sheet according to the third aspect of the present invention.

The optical element laminate according to the fourth aspect of the present invention can be produced by the method according to the second aspect of the present invention and can exhibit the same effects.

Advantageous Effects of Invention

According to the method for producing a pressure-sensitive adhesive sheet and the pressure-sensitive adhesive sheet of the present invention, even when the pressure-sensitive adhesive sheet is blended with additives, a change in physical properties of the pressure-sensitive adhesive layer and interference between the additives are unlikely to occur.

Since there is no need to design the pressure-sensitive adhesive layer from the beginning with respect to changes in the thickness of the pressure-sensitive adhesive layer and the amount of additives blended, its efficiency is high.

BRIEF DESCRIPTION OF DRAWINGS

FIGS. 1(a) to (e) illustrate a process for implementing one embodiment of a method for producing a pressure-sensitive adhesive sheet according to the present invention, in which FIG. 1(a) is a schematic view illustrating a pressure-sensitive adhesive layer forming step, FIG. 1(b) is a schematic view illustrating a pressure-sensitive adhesive layer curing step, FIG. 1(c) is a schematic view illustrating a solution application step, FIG. 1(d) is a schematic view illustrating a solution infiltration step, and FIG. 1(e) is a schematic view illustrating a drying step.

FIG. 3 is a cross-sectional view of an optical element laminate presented as one example of the simplest embodiment using a pressure-sensitive adhesive sheet according to the present invention.

FIGS. 44(a) to (d) are schematic views illustrating a process for implementing one embodiment of a method for producing an optical element laminate using a hybrid adhesive sheet of the present invention.

FIG. 5(a) shows the results of Example 9, and FIG. 5(b) shows the results of Comparative Example 9. In FIG. 5, the scale of the left vertical axis indicates the intensity of butyl acrylate (BA) and N-vinylpyrrolidone (NVP) and the scale of the right vertical axis indicates the intensity of the ultraviolet absorbing agent (Tinosorb S).

DESCRIPTION OF EMBODIMENTS

Figure 1:
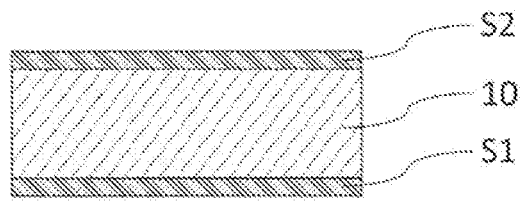
Figure 1:
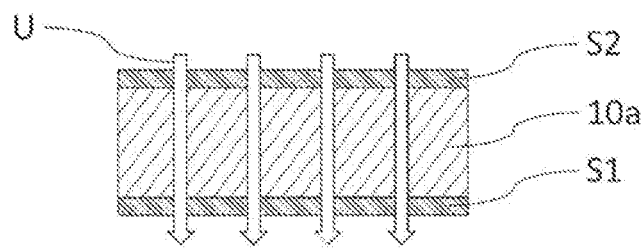
Figure 1:
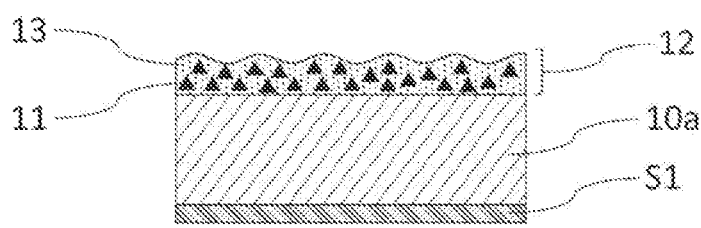
Figure 1:
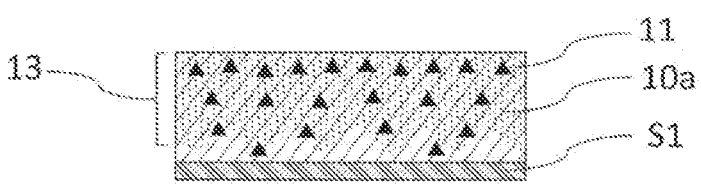
Figure 1:
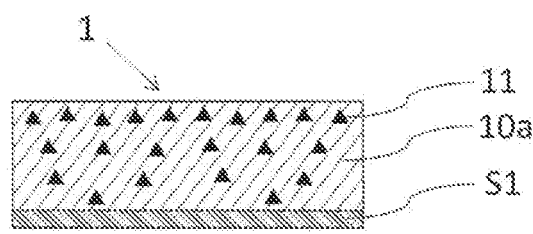

Hereinafter, embodiments of the present invention will be described with reference to the accompanying figures, but the present invention is not limited thereto. The embodiments are merely illustrative.

FIGS. 1(a) to (e) are views schematically illustrating a process for implementing one embodiment of a method for producing a pressure-sensitive adhesive sheet according to the first aspect of the present invention.

As illustrated in FIG. 1(a), a pressure-sensitive adhesive layer 10 formed of a transparent base pressure-sensitive adhesive material is first formed on a support S1 (pressure-sensitive adhesive layer forming step).

The support is not particularly limited and is preferably a plastic film. Examples of materials of the plastic film and the like include plastic materials such as polyester resins including polyethylene terephthalate (PET); acrylic resins including polymethyl methacrylate (PMMA); polycarbonate; triacetyl cellulose (TAC); polysulfone; polyacrylate; polyimide; polyvinyl chloride; polyvinyl acetate; polyethylene; polypropylene; ethylene-propylene copolymer; cyclic olefin-based polymer including trade name "ARTON" (cyclic olefin-based polymer, manufactured by JSR Corporation) and trade name "ZEONOR" (cyclic olefin-based polymer, Zeon Corporation). Note that these plastic materials may be used either alone or in combination of two or more thereof.

The support may be a release sheet. Examples of the release sheet include, but not particularly limited to, a plastic film whose surface is treated by a release agent such as silicon type, long-chain alkyl type, fluorine type, and molybdenum sulfide.

The base pressure-sensitive adhesive material is not particularly limited as long as it is a transparent adherent material usable in optical applications. For example, it is possible to use one or more appropriately selected from an acrylic pressure-sensitive adhesive, a rubber-based pressure-sensitive adhesive, a silicone-based pressure-sensitive adhesive, a polyester-based pressure-sensitive adhesive, a urethane-based pressure-sensitive adhesive, an epoxy-based pressure-sensitive adhesive, and a polyether-based pressure-sensitive adhesive. From the viewpoint of transparency, processability, durability, etc., it is preferable to use an acrylic pressure-sensitive adhesive. As the base pressure-sensitive adhesive material, the above pressure-sensitive adhesives can be used independently or in combination of two or more thereof. An acrylic polymer to be used as a base polymer of an acrylic pressure-sensitive adhesive is preferably, but not particularly limited to, a homopolymer or a copolymer of monomers containing a primary component consisting of (meth)acrylic acid alkyl ester. The expression "(meth)acrylic" is used herein to mean either one or both of "acrylic" and "methacrylic", and the same applies to the other. In the present invention, the term "acrylic polymer" is used to mean that it may include the above (meth)acrylic acid alkyl ester and another monomer copolymerizable with it.

When the base pressure-sensitive adhesive material contains an acrylic polymer as an acrylic pressure-sensitive adhesive, the acrylic polymer preferably contains a monomer unit derived from an acrylic acid alkyl ester having a linear or branched alkyl group and/or a methacrylic acid alkyl ester having a linear or branched alkyl group as the main monomer unit in the highest proportion by weight.

Examples of the (meth)acrylic acid alkyl ester having a linear or branched alkyl group to constitute the monomer unit of the acrylic polymer, i.e., the (meth)acrylic acid alkyl ester having a linear or branched alkyl group contained in a monomer component to form the acrylic polymer, include a (meth)acrylic acid alkyl ester having a linear or branched alkyl group with 1 to 20 carbon atoms, such as methyl (meth)acrylate, ethyl (meth)acrylate, propyl (meth)acrylate, isopropyl (meth)acrylate, n-butyl (meth)acrylate, s-butyl (meth)acrylate, isobutyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, isostearyl (meth)acrylate, nonadecyl (meth)acrylate, and eicosyl (meth)acrylate. As the (meth)acrylic acid alkyl ester for the acrylic polymer, one (meth)acrylic acid alkyl ester may be used, or two or more (meth)acrylic acid alkyl esters may be used. In the present embodiment, at least one selected from the group consisting of n-butyl acrylate, 2-ethylhexyl acrylate, and isostearyl acrylate is preferably used as the (meth)acrylic acid alkyl ester for the acrylic polymer.

In the acrylic polymer, a proportion of the monomer unit derived from the (meth)acrylic acid alkyl ester having a linear or branched alkyl group is preferably 50% by weight or more, more preferably 60% by weight or more, more preferably 70% by weight or more, more preferably 80% by weight or more, and more preferably 90% by weight or more. In other words, the proportion of the (meth)acrylic acid alkyl ester in a monomer composition of a raw material to form the acrylic polymer is preferably 50% by weight or more, more preferably 60% by weight or more, more preferably 70% by weight or more, more preferably 80% by weight or more, and more preferably 90% by weight or more.

The acrylic polymer contained in the base pressure-sensitive adhesive material may contain a monomer unit derived from an alicyclic monomer. Examples of the alicyclic monomer to constitute the monomer unit of the acrylic polymer, i.e., the alicyclic monomer contained in the monomer component to form the acrylic polymer, include (meth) acrylic acid cycloalkyl ester, (meth)acrylic acid ester having a bicyclic hydrocarbon ring, and (meth)acrylic acid ester having a tricyclic or more hydrocarbon ring. Examples of the (meth)acrylic acid cycloalkyl ester include cyclopentyl (meth)acrylate, cyclohexyl (meth)acrylate, cycloheptyl (meth)acrylate, and cyclooctyl (meth)acrylate. Examples of the (meth)acrylic acid ester having bicyclic hydrocarbon ring include bornyl (meth)acrylate and isobornyl (meth) acrylate. Examples of the (meth)acrylic acid ester having a tricyclic or more hydrocarbon ring include dicyclopentanyl (meth)acrylate, dicyclopentanyloxyethyl (meth)acrylate, tricyclopentanyl (meth)acrylate, 1-adamantyl (meth)acrylate, 2-methyl-2-adamantyl (meth)acrylate, and 2-ethyl-2-adamantyl (meth)acrylate. As the alicyclic monomer for the acrylic polymer, one alicyclic monomer may be used, or two or more alicyclic monomers may be used. In the present embodiment, at least one selected from the group consisting of cyclohexyl acrylate, cyclohexyl methacrylate, isobornyl acrylate, and isobornyl methacrylate is preferably used as the alicyclic monomer for the acrylic polymer.

In the acrylic polymer, a proportion of the monomer unit derived from the alicyclic monomer is preferably 5 to 60% by weight, more preferably 10 to 50% by weight, more preferably 12 to 40% by weight, from the viewpoint of realizing appropriate flexibility in the base pressure-sensitive adhesive material formed containing the acrylic polymer.

The acrylic polymer contained in the base pressure-sensitive adhesive material may contain a monomer unit derived from a hydroxy group-containing monomer. The hydroxy group-containing monomer is a monomer having at least one hydroxy group in its monomer unit. When the acrylic polymer in the base pressure-sensitive adhesive material contains a hydroxy group-containing monomer unit, the base pressure-sensitive adhesive material readily offers adhesiveness and appropriate cohesive force. The hydroxy group may also serve as a reactive site to a crosslinking agent described later.

Examples of the hydroxy group-containing monomer to constitute a monomer unit of the acrylic polymer, i.e., the hydroxy group-containing monomer contained in the monomer component to form the acrylic polymer, include hydroxy group-containing (meth)acrylic acid ester, vinyl alcohol, and allyl alcohol. Examples of the hydroxy group-containing (meth)acrylic acid ester include 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, hydroxyoctyl (meth)acrylate, hydroxydecyl (meth)acrylate, hydroxylauryl (meth) acrylate, and (4-hydroxymethylcyclohexyl)methyl (meth) acrylate. As the hydroxy group-containing monomer for the acrylic polymer, one hydroxy group-containing monomer may be used, or two or more hydroxy group-containing monomers may be used. In the present embodiment, at least one selected from the group consisting of 2-hydroxyethyl acrylate, 2-hydroxyethyl methacrylate, 2-hydroxypropyl acrylate, 2-hydroxypropyl methacrylate, 4-hydroxybutyl acrylate, and 4-hydroxybutyl methacrylate is preferably used as the hydroxy group-containing monomer for the acrylic polymer.

In the acrylic polymer, a proportion of the monomer unit derived from the hydroxy group-containing monomer is preferably 1% by weight or more, more preferably 2% by weight or more, more preferably 3% by weight or more, more preferably 7% by weight or more, more preferably 10% by weight or more, and more preferably 15% by weight or more. In the acrylic polymer, the proportion of the monomer unit derived from the hydroxy group-containing monomer is preferably 35% by weight or less and more preferably 30% by weight or less. These configurations regarding the proportion of the hydroxy group-containing monomer are preferable to realize adhesiveness and appropriate cohesive force in the base pressure-sensitive adhesive material formed containing the acrylic polymer.

The acrylic polymer contained in the base pressure-sensitive adhesive material may contain a monomer unit derived from a nitrogen atom-containing monomer. The nitrogen atom-containing monomer is a monomer having at least one nitrogen atom in its monomer unit. When the acrylic polymer in the base pressure-sensitive adhesive material contains a nitrogen atom-containing monomer unit, the base pressure-sensitive adhesive material readily offers hardness and satisfactory adhesive reliability.

Examples of the nitrogen atom-containing monomer to constitute a monomer unit of the acrylic polymer, i.e., the nitrogen atom-containing monomer contained in the monomer component to form the acrylic polymer, include cyclic N-vinylamides and (meth)acrylamides. Examples of the cyclic N-vinylamides which are nitrogen atom-containing monomers include N-vinyl-2-pyrrolidone, N-vinyl-2-piperidone, N-vinyl-3-morpholinone, N-vinyl-2-caprolactam, N-vinyl-1,3-oxazin-2-one, and N-vinyl-3,5-morpholinedione. Examples of the (meth)acrylamides which are nitrogen atom-containing monomers include (meth)acrylamide, N-ethyl (meth)acrylamide, N-isopropyl (meth)acrylamide, N-n-butyl (meth)acrylamide, N-octyl (meth)acrylamide, N,N-dimethyl (meth)acrylamide, N,N-diethyl (meth)acrylamide, N,N-dipropyl (meth)acrylamide, and N,N-diisopropyl (meth)acrylamide. As the nitrogen atom-containing monomer for the acrylic polymer, one nitrogen atom-containing monomer may be used, or two or more nitrogen atom-containing monomers may be used. In the present embodiment, N-vinyl-2-pyrrolidone is preferably used as the nitrogen atom-containing monomer for the acrylic polymer.

In the acrylic polymer, a proportion of the monomer unit derived from the nitrogen atom-containing monomer is preferably 1% by weight or more, more preferably 3% by weight or more, and more preferably 5% by weight or more, from the viewpoint of realizing appropriate hardness, adhesiveness, and transparency in the base pressure-sensitive adhesive material formed containing the acrylic polymer. In the acrylic polymer, the proportion of the monomer unit derived from the nitrogen atom-containing monomer is preferably 30% by weight or less and more preferably 25% by weight or less, from the viewpoint of realizing sufficient transparency in the base pressure-sensitive adhesive material formed by containing the acrylic polymer and the viewpoint of suppressing the base pressure-sensitive adhesive material from becoming excessively hard to realize satisfactory adhesive reliability.

The acrylic polymer contained in the base pressure-sensitive adhesive material may contain a monomer unit derived from a carboxy group-containing monomer. The carboxy group-containing monomer is a monomer having at least one carboxy group in its monomer unit. When the acrylic polymer in the base pressure-sensitive adhesive material contains a carboxy group-containing monomer unit, the base pressure-sensitive adhesive material may offer satisfactory adhesive reliability. The carboxy group may also serve as a reactive site to a crosslinking agent described later.

Examples of the carboxy group-containing monomer to constitute a monomer unit of the acrylic polymer, i.e., the carboxy group-containing monomer contained in the monomer component to form the acrylic polymer, include (meth) acrylic acid, itaconic acid, maleic acid, fumaric acid, crotonic acid, and isocrotonic acid. As the carboxy group-containing monomer for the acrylic polymer, one carboxy group-containing monomer may be used, or two or more carboxy group-containing monomers may be used. In the present embodiment, acrylic acid is preferably used as the carboxy group-containing monomer for the acrylic polymer.

In the acrylic polymer, a proportion of the monomer unit derived from the carboxy group-containing monomer is preferably 0.1% by weight or more and more preferably 0.5% by weight or more, from the viewpoint of obtaining a contribution of interaction between a polar group and a carboxy group when the polar group is present on an object surface in the base pressure-sensitive adhesive material formed by containing the acrylic polymer to ensure satisfactory adhesive reliability. In the acrylic polymer, the proportion of the monomer unit derived from the carboxy group-containing monomer is also preferably 20% by weight or less and more preferably 15% by weight or less, from the viewpoint of suppressing the base pressure-sensitive adhesive material formed by containing the acrylic polymer from becoming excessively hard to realize satisfactory adhesive reliability.

The acrylic polymer contained in the base pressure-sensitive adhesive material may have a crosslinked structure derived from a crosslinking agent. Having a crosslinked structure, the base pressure-sensitive adhesive material has an increased viscosity and thus improved shape stability, making it easier to form a pressure-sensitive adhesive layer on a support S1. Examples of the crosslinking agent include polyfunctional (meth)acrylate which is a copolymerizable crosslinking agent and a thermosetting crosslinking agent. The acrylic polymer may have a crosslinked structure derived only from the polyfunctional (meth)acrylate, a crosslinked structure derived only from the thermosetting crosslinking agent, and a crosslinked structure derived from both the polyfunctional (meth)acrylate and the thermosetting crosslinking agent.

Note that this crosslinking agent is a crosslinking agent constituting a first trigger (first crosslinking agent) when the pressure-sensitive adhesive sheet of the present invention is a hybrid pressure-sensitive adhesive sheet.

Examples of the polyfunctional (meth)acrylate include 1,6-hexanediol di(meth)acrylate, butanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl(meth)acrylate, and vinyl(meth)acrylate. As the polyfunctional (meth)acrylate for the acrylic polymer, one polyfunctional (meth)acrylate may be used, or two or more polyfunctional (meth)acrylates may be used. In the present embodiment, at least one selected from the group consisting of 1,6-hexanediol diacrylate, dipentaerythritol hexaacrylate, and trimethylolpropane triacrylate is preferably used as the polyfunctional (meth)acrylate for the acrylic polymer.

In the acrylic polymer, a proportion of the monomer unit derived from the polyfunctional (meth)acrylate is preferably 0.01% by weight or more, more preferably 0.03% by weight or more, more preferably 0.05% by weight or more, more preferably 0.1% by weight or more. In the acrylic polymer, the proportion of the monomer unit derived from the polyfunctional (meth)acrylate is preferably 1% by weight or less and more preferably 0.5% by weight or less. These configurations regarding the proportion of the polyfunctional (meth)acrylate are preferable to realize appropriate hardness, adhesiveness, and shape stability in the base pressure-sensitive adhesive material formed by containing the acrylic polymer.

Examples of the thermosetting crosslinking agent include an isocyanate-based crosslinking agent, an epoxy-based crosslinking agent, a metal chelate-based crosslinking agent, a melamine-based crosslinking agent, a peroxide-based crosslinking agent, an urea-based crosslinking agent, a metal alkoxide-based crosslinking agent, a metal salt-based crosslinking agent, a carbodiimide-based crosslinking agent, an oxazoline-based crosslinking agent, an aziridine-based crosslinking agent, and an amine-based crosslinking agent. The base pressure-sensitive adhesive material may contain one of the thermosetting crosslinking agents or two or more of the thermosetting crosslinking agents. Preferably, at least one selected from the group consisting of an isocyanate-based crosslinking agent and an epoxy-based crosslinking agent is used.

Examples of the isocyanate-based crosslinking agent include lower aliphatic polyisocyanates, alicyclic polyisocyanates, and aromatic polyisocyanates. Examples of the lower aliphatic polyisocyanates include 1,2-ethylene diisocyanate, 1,4-butylene diisocyanate, and 1,6-hexamethylene diisocyanate. Examples of the alicyclic polyisocyanates include cyclopentylene diisocyanate, cyclohexylene diisocyanate, isophorone diisocyanate, hydrogenated tolylene diisocyanate, and hydrogenated xylene diisocyanate. Examples of the aromatic polyisocyanates include 2,4-tolylene diisocyanate, 2,6-tolylene diisocyanate, 4,4'-diphenylmethane diisocyanate, and xylylene diisocyanate. Examples of the isocyanate-based crosslinking agent include commercial products such as trimethylolpropane/tolylene diisocyanate adduct (trade name "CORONATE L", manufactured by Tosoh Corporation), trimethylolpropane/hexamethylene diisocyanate adduct (trade name "CORONATE HL", manufactured by Tosoh Corporation), and trimethylolpropane/xylylene diisocyanate adduct (trade name "TAKENATE D-110N", manufactured by Mitsui Chemicals Inc.).

Examples of the epoxy-based crosslinking agent (polyfunctional epoxy compound) include N,N,N',N'-tetraglycidyl-m-xylenediamine, diglycidylaniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris(2,-hydroxyethyl)isocyanurate, resorcin diglycidyl ether, and bisphenol-S-diglycidyl ether. Examples of the epoxy-based crosslinking agent include an epoxy-based resin having two or more epoxy groups. In addition, examples of the epoxy-based crosslinking agent include commercial products such as trade name "TETRAD C" (manufactured by Mitsubishi Gas Chemical Company, Inc.).

When the base pressure-sensitive adhesive material contains the above thermosetting crosslinking agent for crosslinking between the acrylic polymers, a content of the thermosetting crosslinking agent in the base pressure-sensitive adhesive material is preferably 0.001 parts by weight or more and more preferably 0.01 parts by weight or more relative to 100 parts by weight of the acrylic polymer in the base pressure-sensitive adhesive material, from the viewpoint of improving the shape stability of the base pressure-sensitive adhesive material, making it easier to form the pressure-sensitive adhesive layer on the support S1, and thus realizing sufficient adhesive reliability to the object. The content of the thermosetting crosslinking agent in the base pressure-sensitive adhesive material is also preferably 10 parts by weight or less and more preferably 5 parts by weight or less relative to 100 parts by weight of the acrylic polymer in the base pressure-sensitive adhesive material, from the viewpoint of imparting appropriate flexibility to the base pressure-sensitive adhesive material to realize satisfactory adhesive strength.

When the base pressure-sensitive adhesive material contains the above acrylic polymer as a pressure-sensitive adhesive, a content ratio of the acrylic polymer in the base pressure-sensitive adhesive material is, for example, 85 to 100% by weight.

The base pressure-sensitive adhesive material may also contain a polymerization initiator in addition to the monomer to form the acrylic polymer and the crosslinking agent. Examples of the polymerization initiator include a photopolymerization initiator and a thermopolymerization initiator. The base pressure-sensitive adhesive material may contain one polymerization initiator or two or more polymerization initiators.

Note that this polymerization initiator is a polymerization initiator constituting a first trigger (first polymerization initiator) when the pressure-sensitive adhesive sheet of the present invention is a hybrid pressure-sensitive adhesive sheet.

Examples of the photopolymerization initiator include a benzoin ether-based photopolymerization initiator, an acetophenone-based photopolymerization initiator, an α-ketol-based photopolymerization initiator, an aromatic sulfonyl chloride-based photopolymerization initiator, a photoactive oxime-based photopolymerization initiator, a benzoin-based photopolymerization initiator, a benzyl-based photopolymerization initiator, a benzophenone-based photopolymerization initiator, a ketal-based photopolymerization initiator, and a thioxanthone-based photopolymerization initiator. Examples of the benzoin ether-based photopolymerization initiator include benzoin methyl ether, benzoin ethyl ether, benzoin propyl ether, benzoin isopropyl ether, benzoin isobutyl ether, and 2,2-dimethoxy-1,2-diphenylethan-1-one. Examples of the acetophenone-based photopolymerization initiator include 2,2-diethoxyacetophenone, 2,2-dimethoxy-2-phenylacetophenone, 1-hydroxycyclohexyl phenyl ketone, 4-phenoxy dichloroacetophenone, and 4-(t-butyl) dichloroacetophenone. Examples of the α-ketol-based photopolymerization initiator include 2-methyl-2-hydroxy propiophenone, and 1-[4-(2-hydroxyethyl)phenyl]-2-methylpropan-1-one. Examples of the aromatic sulfonyl chloride-based photopolymerization initiator include 2-naphthalenesulfonyl chloride. Examples of the photoactive oxime-based photopolymerization initiator include 1-phenyl-1,1-propanedione-2-(o-ethoxycarbonyl)-oxime. Examples of the benzoin-based photopolymerization initiator include benzoin. Examples of the benzyl-based photopolymerization initiator include benzyl. Examples of the benzophenone-based photopolymerization initiator include benzophenone, benzoylbenzoic acid, 3,3'-dimethyl-4-methoxy benzophenone, and polyvinyl benzophenone. Examples of the ketal-based photopolymerization initiator include benzyl dimethyl ketal. Examples of the thioxanthone-based photopolymerization initiator include thioxanthone, 2-chloro thioxanthone, 2-methyl thioxanthone, 2,4-dimethyl thioxanthone, isopropyl thioxanthone, 2,4-diisopropyl thioxanthone, and dodecyl thioxanthone.

An amount of the photopolymerization initiator to be used is not particularly limited, but for example, it is preferably 0.001 to 1 part by weight and more preferably 0.01 to 0.50 parts by weight relative to 100 parts by weight of a total monomer unit of the acrylic polymer (total monomer component constituting the acrylic polymer).

Examples of the thermopolymerization initiator include an azo-based polymerization initiator, a peroxide-based polymerization initiator, and a redox-based polymerization initiator. Examples of the azo-based polymerization initiator include 2,2'-azobisisobutyronitrile (AIBN), 2,2'-azobis methylbutyronitrile (AMBN), 2,2'-azobis(2-methylpropionate)dimethyl, 4,4'-azobis-4-cyanovaleric acid, 2,2'-azobis (4-methoxy-2,4-dimethylvaleronitrile), 2,2'-azobis(2,4-dimethylvaleronitrile), 1,1'-azobis(cyclohexane-1-carbonitrile), and 2,2'-azobis(2,4,4-trimethylpentane). Examples of the peroxide-based polymerization initiator include benzoyl peroxide, t-butyl hydroperoxide, di-t-butyl peroxide, t-butyl peroxybenzoate, dicumyl peroxide, 1,1-bis(t-butyl peroxy)-3,3,5-trimethylcyclohexane, and 1,1-bis(t-butyl peroxy)cyclododecane.

An amount of the thermopolymerization initiator to be used is not particularly limited, but for example, it is preferably 0.05 to 0.5 parts by weight and more preferably 0.1 to 0.3 parts by weight relative to 100 parts by weight of a total monomer unit of the acrylic polymer (total content of a monomer component constituting the acrylic polymer).

The base pressure-sensitive adhesive material may further contain additives, such as a crosslinking accelerator, a silane coupling agent, a tackifier resin, an anti-aging agent, a filler, a coloring agent including pigment and dye, an antioxidant, a chain transfer agent, a plasticizer, a softener, and a surfactant, if necessary. Examples of the tackifier resin include a rosin derivative, polyterpene resin, petroleum resin, and oil-soluble phenol.

Note that when an additive described later is an ultraviolet absorbing agent, it is preferable that the base pressure-sensitive adhesive material does not contain or substantially contain the ultraviolet absorbing agent. Such a configuration is preferable in terms of minimizing deterioration in curability and differences in physical properties between the front and back when the pressure-sensitive adhesive sheet of the present invention is subjected to a curing step of the pressure-sensitive adhesive layer described later. When a proportion of the ultraviolet absorbing agent is 0.05% by weight or less (preferably 0.01% by mass or less) in the total content of the base pressure-sensitive adhesive material (100% by mass), the base pressure-sensitive adhesive material does not substantially contain the ultraviolet absorbing agent.

When an additive described later is a rust inhibitor, it is preferable that the base pressure-sensitive adhesive material does not contain or substantially contain the rust inhibitor. Such a configuration is preferable in terms of minimizing effects of the rust inhibitor on the pressure-sensitive adhesive layer of pressure-sensitive adhesive sheet of the present invention. When a proportion of the rust inhibitor is 0.05% by weight or less (preferably 0.01% by mass or less) in the total content of the base pressure-sensitive adhesive material (100% by mass), the base pressure-sensitive adhesive material does not substantially contain the rust inhibitor.

When an additive described later is an antistatic agent, it is preferable that the base pressure-sensitive adhesive material does not contain or substantially contain the antistatic agent. Such a configuration is preferable in terms of minimizing effects of the antistatic agent on the pressure-sensitive adhesive layer of pressure-sensitive adhesive sheet of the present invention. When a proportion of the antistatic agent is 0.05% by weight or less (preferably 0.01% by mass or less) in the total content of the base pressure-sensitive adhesive material (100% by mass), the base pressure-sensitive adhesive material does not substantially contain the antistatic agent.

Examples of methods of forming the pressure-sensitive adhesive layer include, but not particularly limited to, applying (coating) the base pressure-sensitive adhesive material on a support to dry and cure the resulting pressure-sensitive adhesive composition layer; and applying (coating) the base pressure-sensitive adhesive material on a support to cure the resulting pressure-sensitive adhesive composition layer by irradiation with an active energy ray. If necessary, the methods may further include heating and drying.

For the application (coating) in the base pressure-sensitive adhesive material, it is possible to use known coating processes, and examples thereof include a coater, such as a gravure roll coater a reverse roll coater, a kiss roll coater, a dip roll coater, a bar coater, a knife coater, a spray coater, a comma coater, or a direct coater.

The drying and curing temperature is preferably 40 to 200° C., more preferably 50 to 180° C., and even more preferably 60 to 170° C. The drying and curing time may be adopted as appropriate and is, for example, 5 seconds to 20 minutes, preferably 5 seconds to 10 minutes, and more preferably 10 seconds to 5 minutes.

Examples of the active energy ray include ionizing radiations such as an α-ray, a β-ray, a γ-ray, a neutron ray, and an electron ray and ultraviolet rays, and particularly, the ultraviolet rays are preferable. Irradiation energy, irradiation time, and irradiation method of the active energy ray are not particularly limited, and each may be set appropriately to achieve a desired viscosity and viscoelasticity, depending on a thickness of a pressure-sensitive adhesive layer 10 or the like.

A principal surface of the pressure-sensitive adhesive layer formed above that does not face the support is preferably further laminated with another support (including a release sheet) to block oxygen that inhibits light curing when the pressure-sensitive adhesive layer is light-cured by the above active energy ray and/or ultraviolet irradiation described later, etc.

Next, the pressure-sensitive adhesive layer 10 is cured (curing step of pressure-sensitive adhesive layer). In FIG. 1(b), 10a is a pressure-sensitive adhesive layer being the cured pressure-sensitive adhesive layer 10. Examples of methods of curing the pressure-sensitive adhesive layer 10 include, but not particularly limited to, heating the pressure-sensitive adhesive layer 10 and curing the pressure-sensitive adhesive layer 10 by irradiation with the active energy ray. If necessary, the methods may further include heating and drying. Examples of the active energy ray include ionizing radiations such as an α-ray, a β-ray, a γ-ray, a neutron ray, and an electron ray and ultraviolet rays, and particularly, the ultraviolet rays are preferable.

Conditions of curing the pressure-sensitive adhesive layer 10 can be appropriately selected so that the pressure-sensitive adhesive layer 10a has desired physical properties by an embodiment.

For example, when the base pressure-sensitive adhesive material in the pressure-sensitive adhesive sheet of the present invention is a hybrid pressure-sensitive adhesive sheet containing the polymerization initiator and the crosslinking agent, heating temperature and time or an irradiation dose of the active energy rays may be set appropriately so that the pressure-sensitive adhesive layer 10a exhibits high fluidity and excellent level difference absorbability.

On the other hand, when an additive described later is an ultraviolet absorbing agent, a rust inhibitor, or an antistatic agent, the heating temperature and time or the irradiation dose of the active energy rays may be set appropriately so that the pressure-sensitive adhesive layer 10a exhibits high elastic modulus and excellent adhesive reliability.

FIG. 1(b) is an embodiment in which the pressure-sensitive adhesive layer 10 is cured by irradiating the pressure-sensitive adhesive layer 10 with an ultraviolet ray U. The pressure-sensitive adhesive layer 10 may be directly irradiated with ultraviolet rays but is preferably irradiated through a support to block oxygen that inhibits curing by ultraviolet irradiation. FIG. 1(b) is an embodiment in which the pressure-sensitive adhesive layer 10 is irradiated with ultraviolet rays through a support S2. When ultraviolet rays are irradiated through a support, another support S2 (including a release sheet) is laminated onto a principal surface of the pressure-sensitive adhesive layer 10 opposite to the principal surface facing the support S1 to irradiate the ultraviolet rays through the support. The illuminance and time of ultraviolet irradiation are appropriately set according to the composition of the base pressure-sensitive adhesive material and the thickness of the pressure-sensitive adhesive layer. For the ultraviolet irradiation, a high-pressure mercury lamp, a low-pressure mercury lamp, a metal halide lamp, and the like can be used.

Next, as illustrated in FIG. 1(c), after the support S2 is released and removed, a solution 12 of an additive 11 is applied to one of opposite surfaces of the pressure-sensitive adhesive layer 10a (solution application step). The solution of the additive is not particularly limited as long as it can be coated on the pressure-sensitive adhesive layer in liquid form and infiltrates. When the additive is in liquid form, for example, the additive itself may be applied as a solution as it is. It may also be a solution in which the additive is dissolved in a solvent. Alternatively, when the additive is a combination of two or more types (e.g., a second polymerization initiator and a second crosslinking agent as a second trigger), the solution may be obtained by mixing them. FIG. 1(c) is an embodiment of applying a solution 12 in which an additive 11 is dissolved in a solvent 13 to one of opposite surfaces of the pressure-sensitive adhesive layer 10a.

On the surface of the pressure-sensitive adhesive layer 10a, the additive 11 in the solution 12 infiltrates into the pressure-sensitive adhesive layer 10a in the thickness direction (solution infiltration step). This state is illustrated in FIG. 1(d). When the solution 12 is a solution in which the additive 11 is dissolved in the solvent 13, the surface of the pressure-sensitive adhesive layer 10a is swollen by the infiltration of the solvent 13, and the additive 11 infiltrates into the pressure-sensitive adhesive layer 10a in a dissolved state in the solvent. The additive 11 becomes "dissolved" within the pressure-sensitive adhesive layer 10a.

In the process of causing the additive 11 to infiltrate the pressure-sensitive adhesive layer 10a, a concentration gradient can be formed in the thickness direction. Therefore, the concentration of the additive 11 on a side to which the solution 12 is applied can be higher than on the opposite side. This state is illustrated in FIG. 1(d).

Thereafter, a pressure-sensitive adhesive sheet 1 as illustrated in FIG. 1(e) can be obtained by drying the pressure-sensitive adhesive layer 10a (drying step). When the solution 12 is a solution in which the additive 11 is dissolved in the solvent 13, the infiltrated solvent 13 is evaporated by drying step. The pressure-sensitive adhesive layer 10a returns to a state close to that before application by drying the pressure-sensitive adhesive layer 10a. Therefore, a change in the physical properties of the pressure-sensitive adhesive layer 10a due to the additive 11 can be minimized. Once the pressure-sensitive adhesive layer 10a is dried, the infiltration of the additive 11 into the pressure-sensitive adhesive layer 10a stopped, and the concentration gradient of the additive is fixed.

The additive can be used without limitation as long as they are additives in a field of the pressure-sensitive adhesive, and examples thereof include a polymerization initiator, crosslinking agent, an ultraviolet absorbing agent, rust inhibitor, an antistatic agent, a crosslinking accelerator, a silane coupling agent, a tackifier resin, an anti-aging agent, a coloring agent such as dye, an antioxidant, a chain transfer agent, a plasticizer, a softener, and a surfactant. From the viewpoint of making it easier to achieve the desired effects of the invention, a polymerization initiator, a crosslinking agent, an ultraviolet absorbing agent, a rust inhibitor, and an antistatic agent are preferred.

Note that acid is not preferred as the additive. In other words, acid is excluded as the additive. Examples of such an acid include organic acids such as acetic acid, propionic acid, and lactic acid, and particularly lactic acid.

Examples of the polymerization initiator and the crosslinking agent are exemplified as the same of the polymerization initiator and crosslinking agent that can be contained in the base pressure-sensitive adhesive material, they can be used alone or in combination of two or more.

When the pressure-sensitive adhesive sheet of the present invention is a hybrid pressure-sensitive adhesive sheet, the base pressure-sensitive adhesive material contains a first polymerization initiator and a first crosslinking agent as a first trigger; the pressure-sensitive adhesive layer curing step is curing by reaction of the first polymerization initiator and the first crosslinking agent; and the additive 11 is at least one selected from the group consisting of a second polymerization initiator and a second crosslinking agent as a second trigger.

After the pressure-sensitive adhesive layer curing step, both or either one of the first polymerization initiator and the first crosslinking agent may remain. In this case, only one of the second polymerization initiator and the second crosslinking agent can be used as the additive 11. However, it is also possible to use both the second polymerization initiator and the second crosslinking agent as the additive.

When the pressure-sensitive adhesive sheet of the present invention is a hybrid pressure-sensitive adhesive sheet, the degree of freedom in combination of the first trigger and the second trigger is extremely wide. In other words, there are no limitations on the combination of polymerization initiators, and for example, combinations of photopolymerization initiators for both the first and second triggers, combinations of a thermopolymerization initiator for the first trigger and a photopolymerization initiator for the second trigger, combinations of a photopolymerization initiator for the first trigger and a thermopolymerization initiator for the second trigger, etc., can be freely selected. In addition, it is also possible to use a combination of thermopolymerization initiator for both the first and second triggers, which has been difficult with conventional hybrid pressure-sensitive adhesive sheets. In the case of the combinations of photopolymerization initiators for both the first and second triggers, light absorption wavelength bands of the two photopolymerization initiators can overlap or approximate each other. Furthermore, it is also possible to use a combination of the same polymerization initiator (regardless of whether it is a thermopolymerization initiator or photopolymerization initiator) as the first and second triggers, which had been impossible with conventional hybrid pressure-sensitive adhesive sheets.

There are also no limitations on combinations of crosslinking agents, and it is possible to use a combination of the same crosslinking agent as the first and second triggers.

Examples of the ultraviolet absorbing agent include, but not particularly limited to, a triazine-based ultraviolet absorbing agent, a benzotriazole-based ultraviolet absorbing agent, a benzophenone-based ultraviolet absorbing agent, an oxybenzophenone-based ultraviolet absorbing agent, a salicylic acid ester-based ultraviolet absorbing agent, and a cyanoacrylic acid-based ultraviolet absorbing agent, and they can be used alone or in combination of two or more. Among them, preferred are a triazine-based ultraviolet absorbing agent, a benzotriazole-based ultraviolet absorbing agent, and a benzophenone-based ultraviolet absorbing agent; and particularly preferred is at least one ultraviolet absorbing agent selected from the group consisting of a triazine-based ultraviolet absorbing agent having, in a single molecule thereof, not more than two hydroxyl groups, a benzotriazole-based ultraviolet absorbing agent having, in a single molecule thereof, one benzotriazole skeleton, and a benzophenone-based ultraviolet absorbing agent since it is good in solubility and high in ultraviolet absorbing power at a wavelength of 380 nm and thereabouts.

Specific examples of the triazine-based an ultraviolet absorbing agent having, in a single molecule thereof, not more than two hydroxyl groups include 2,4-bis-[{4-(4-ethylhexyloxy)-4-hydroxy}-phenyl]-6-(4-methoxyphenyl)-1,3,5-triazine (Tinosorb S, manufactured by BASF); 2,4-bis[2-hydroxy-4-butoxyphenyl]-6-(2,4-dibutoxyphenyl)-1,3,5-triazine (TINUVIN 460, manufactured by BASF); a reaction product made from 2-(4,6-bis(2,4-dimethylphenyl)-1,3,5-triazin-2-yl)-5-hydroxy phenyl and [($C_{10}$-$C_{16}$ (mainly $C_{12}$-$C_{13}$)alkyloxy)methyl]oxirane (TINUVIN400, manufactured by BASF); a reaction product made from 2-[4,6-bis(2,4-dimethylphenyl)-1,3,5-triazin yl]-5-[3-(dodecyloxy)-2-hydroxypropoxy]phenol), 2-(2,4-dihydroxy phenyl)-4,6-bis-(2,4-dimethylphenyl)-1,3,5-triazine, and (2-ethylhexyl)-glycidic acid ester (TINUVIN405, manufactured by BASF); 2-(4,6-diphenyl-1,3,5-triazin-2-yl)-5-[(hexyl)oxy]-phenol (TINUVIN1577, manufactured by BASF); 2-(4,6-diphenyl-1,3,5-triazine-2-yl)-5-[2-(2-ethylhexanoyloxy)ethoxy]-phenol (ADK STAB LA46, manufactured by ADEKA Corporation); and 2-(2-hydroxy-4-[1-octyloxycarbonylethoxy]phenyl)-4,6-bis(4-phenylphenyl)-1,3,5-triazine (TINUVIN 479, manufactured by BASF).

Examples of the benzotriazole-based ultraviolet absorbing agent having, in a single molecule thereof, one benzotriazole skeleton include 2-(2H-benzotriazol-2-yl)-6-(1-methyl-1-phenylethyl)-4-(1,1,3,3-tetramethylbutyl)phenol (TINUVIN 928, manufactured by BASF); 2-(2-hydroxy-5-tert-butyl phenyl)-2H-benzotriazole (TINUVIN PS, manufactured by BASF); an ester compound of benzenepropanoic acid and 3-(2H-benzotriazol-2-yl)-5-(1,1-dimethylethyl)-4-hydroxy ($C_{7-9}$ side chain and linear alkyls) (TINUVIN 384-2, manufactured by BASF); 2-(2H-benzotriazol-2-yl)-4,6-bis(1-methyl-1-phenylethyl)phenol (TINUVIN 900, manufactured by BASF); 2-(2H-benzotriazol-2-yl)-6-(1- methyl-1-phenylethyl)-4-(1,1,3,3-tetramethylbutyl)phenol (TINUVIN 928, manufactured by BASF); a reaction product made from methyl-3-(3-(2H-benzotriazol-2-yl)-5-t-butyl hydroxyphenyl)propionate/polyethylene glycol 300 (TINU-VIN1130, manufactured by BASF); 2-(2H-benzotriazol-2-yl)-p-cresol (TINUVIN P, manufactured by BASF); 2(2H-benzotriazole-2-yl)-4-6-bis(1-methyl-1-phenylethyl)phenol (TINUVIN 234, manufactured by BASF); 2-[5-chloro(2H)-benzotriazol-2-yl]-4-methyl-6-(tert-butyl)phenol (TINUVIN 326, manufactured by BASF); 2-(2H-benzotriazole-2-yl)-4,6-di-tert-pentylphenol (TINUVIN 328, manufactured by BASF); 2-(2H-benzotriazole-2-yl)-4-(1,1,3,3-tetramethylbutyl)phenol (TINUVIN 329, manufactured by BASF); a reaction product made from methyl 3-(3-(2H-benzotriazol-2-yl)-5-tert-butyl-4-hydroxyphenyl)propionate and polyethylene glycol 300 (TINUVIN 213, manufactured by BASF); 2-(2H-benzotriazol-2-yl)-6-dodecyl-4-methylphenol (TINUVIN571, manufactured by BASF); and 2-[2-hydroxy-3-(3,4,5,6-tetrahydrophthalimide-methyl)-5-methylphenyl] benzotriazole (Sumisorb 250, manufactured by Sumitomo Chemical Co., Ltd.).

Examples of the benzophenone-based ultraviolet absorbing agent (benzophenone-based compound) and oxybenzophenone-based ultraviolet absorbing agent (oxybenzophenone-based compound) include 2,4-dihydroxybenzophenone, 2-hydroxy-4-methoxybenzophenone, 2-hydroxy-4-methoxy benzophenone-5-sulfonic acid ((anhydride and trihydride), 2-hydroxy octyloxybenzophenone, 4-dodecyloxy-2-hydroxy benzophenone, 4-benzyloxy-2-hydroxybenzophenone, 2,2',4,4'-tetrahydroxybenzophenone (Seesorb 106, manufactured by SHIPRO KASEI KAISHA, LTD.), and 2,2'-dihydroxy-4,4-dimethoxybenzophenone.

Examples of the salicylic acid ester-based ultraviolet absorbing agent (salicylic acid ester-based compound) include phenyl-2-acryloyloxybenzoate, phenyl-2-acryloyloxy-3-methylbenzoate, phenyl-2-acryloyloxy-4-methylbenzoate, phenyl-2-acryloyloxy-5-methylbenzoate, phenyl-2-acryloyloxy-3-methoxybenzoate, phenyl-2-hydroxybenzoate, phenyl-2-hydroxy-3-methylbenzoate, phenyl-2-hydroxy-4-methylbenzoate, phenyl-2-hydroxy-5-methylbenzoate, phenyl 2-hydroxy-3-methoxybenzoate, and 2,4-di-tert-butylphenyl-3,5-di-tert-butyl-4-hydroxybenzoate (TINUVIN 120, manufactured by BASF).

Examples of the cyanoacrylic acid-based ultraviolet absorbing agent (cyanoacrylic acid-based compound) include alkyl-2-cyanoacrylate, cycloalkyl-2-cyanoacrylate, alkoxyalkyl-2-cyanoacrylate, alkenyl-2-cyanoacrylate, and alkynyl-2-cyanoacrylate.

An absorption spectrum of the ultraviolet absorbing agent preferably has a maximum absorption wavelength present in a wavelength region of 300 to 400 nm and more preferably a wavelength region of 320 to 380 nm. When a plurality of absorption maxima are present in the spectral absorption spectrum in the wavelength region of 300 nm to 460 nm, the maximum absorption wavelength means the wavelength of the absorption maximum showing the maximum absorbance out of the maxima.

When the additive is at least one selected from a polymerization initiator and a crosslinking agent, the additive also preferably contains an ultraviolet absorbing agent. When the additive contains an ultraviolet absorbing agent in addition to at least one selected from a polymerization initiator and a crosslinking agent, a hybrid pressure-sensitive adhesive sheet containing the ultraviolet absorbing agent can be produced in a single coating, thereby improving production efficiency. The additive is even more preferable because if a hybrid pressure-sensitive adhesive sheet containing an ultraviolet absorbing agent is irradiated with ultraviolet rays, the ultraviolet absorbing agent that has absorbed the ultraviolet rays generates heat, which accelerates the curing reaction and thus improves adhesive reliability.

Examples of the rust inhibitor include, but not particularly limited to, a benzotriazole-based compound and an amine compound. Further examples thereof include ammonium benzoate, ammonium phthalate, ammonium stearate, ammonium palmitate, ammonium oleate, dicyclohexylamine benzoate, urea, urotropine, thiourea, phenyl carbamate, and cyclohexyl ammonium-N-cyclohexyl carbamate (CHC). Note that the rust inhibitor can be used alone or in combination of two or more.

Examples of the benzotriazole include alkylbenzotriazole with 1 to 6 carbon atoms such as benzotriazole(1,2,3-benzotriazole), 4-methylbenzotriazole, 5-methylbenzotriazole, 4-ethylbenzotriazole, 5-ethylbenzotriazole, 4-propylbenzotriazole, 5-propylbenzotriazole, 4-isopropylbenzotriazole, 5-isopropylbenzotriazole, 4-n-butyl benzotriazole, 5-n-butyl benzotriazole, 4-isobutyl benzotriazole, 5-isobutyl benzotriazole, 4-pentylbenzotriazole, 5-pentylbenzotriazole, 4-hexylbenzotriazole, and 5-hexylbenzotriazole, 5-methoxybenzotriazole, 1-hydroxybenzotriazole, 5-hydroxybenzotriazole, dihydroxypropyl benzotriazole, carboxybenzotriazole, 2,3-dicarboxypropyl benzotriazole, 1-[N,N-bis(2-ethylhexyl)aminomethyl]benzotriazole, 1-[maleic acid]benzotriazole, 4-chlorobenzotriazole, 5-chlorobenzotriazole, 4-nitrobenzotriazole, 5-nitrobenzotriazole, benzotriazole monoethanolamine salt, benzotriazole diethylamine salt; benzotriazole cyclohexylamine salt; benzotriazole morpholine salt, benzotriazoleisopropylamine salt, and methylbenzotriazolecyclohexylamine salt.

Examples of the amine compound include a hydroxy group-containing amine compound, such as 2-amino-2-methyl-1-propanol, monoethanolamine, monoisopropanolamine, diethylethanolamine, ammonia, and ammonia water; cyclic amine, such as morpholine; a cyclic alkylamine compound, such as cyclohexylamine; and linear alkyl amine, such as 3-methoxypropylamine.

The antistatic agent is not particularly limited, but is preferably an ionic compound having a fluorine-containing anion, from the viewpoint of compatibility with the acrylic polymer and transparency of the pressure-sensitive adhesive layer. Examples of the ionic compound having a fluorine-containing anion include $LiCF_3SO_3$, $Li(CF_3SO_2)_2N$, $Li(C_2F_5SO_2)_2N$, $Li(C_4F_9SO_2)_2N$, and $Li(CF_3SO_2)_3C$, and fluorine-containing lithium imide salts such as $Li(CF_3SO_2)_2N$, $Li(C_2F_5SO_2)_2N$, $Li(C_4F_9SO_2)_2N$, and $Li(FSO_2)_2N$ are preferable, and bis(trifluoromethanesulfonyl)imide lithium salts, and bis(fluorosulfonyl)imide lithium salts are particularly preferable. Note that the antistatic agent can be used alone or in combination of two or more.

The solvent is not particularly limited as long as it can dissolve the additive and swell the pressure-sensitive adhesive layer 10a, but a non-aqueous solvent is preferred since an aqueous solvent has poor wettability to the pressure-sensitive adhesive layer and the additive does not easily infiltrate. Examples of the non-aqueous solvent include, but not particularly limited to, esters such as methyl acetate, ethyl acetate, isopropyl acetate, and butyl acetate; aromatic hydrocarbons such as toluene, xylene, and ethylbenzene; ketones such as acetone, methyl ethyl ketone, and methyl isobutyl ketone; alicyclic ketones such as cyclopentanone and cyclohexanone; aliphatic hydrocarbons such as hexane, heptane, and octane; alicyclic hydrocarbons such as cyclohexane; halogenated hydrocarbons such as chloroform, dichloromethane, and 1,2-dichloroethane; ethers such as diethyl ether, dimethoxyethane, tetrahydrofuran, and dioxane; amides such as N,N-dimethylformamide and N,N-dimethylacetamide; nitriles such as acetonitrile, propionitrile, and benzonitrile; and alcohols such as methanol, ethanol, propanol, isopropanol, n-butanol, isobutanol, sec-butanol, and tert-butanol, and esters, aromatic hydrocarbons, ketones, and alcohols are preferable. The solvent can also be used alone or in combination of two or more.

The concentration of the additive in the solution can be appropriately set according to the desired required characteristics to be imparted to the pressure-sensitive adhesive layer 10a and for example, can be selected from 95% by weight or less (e.g., 0.1 to 95% by weight, 0.1 to 90% by weight, 0.1 to 85% by weight, 0.1 to 80% by weight, 0.1 to 70% by weight, 0.1 to 60% by weight, 0.1 to 50% by weight, and 0.1 to 40% by weight) and 0.1% by weight or more (e.g., 0.1 to 95% by weight, 0.2 to 95% by weight, 0.3 to 95% by weight, 0.4 to 95% by weight, 0.5 to 95% by weight, 1 to 95% by weight, 1.5 to 95% by weight, 3 to 95% by weight, and 5 to 95% by weight). If the concentration of the additive in the solution is within this range, the additive can be dissolved, the pressure-sensitive adhesive layer 10a can be sufficiently swollen, and appropriate required characteristics may be imparted to the pressure-sensitive adhesive layer 10a.

Specifically, when the additive is a crosslinking agent, the concentration of the crosslinking agent in solution can be appropriately set according to the desired curing properties to be imparted to the pressure-sensitive adhesive layer 10a and for example, can be appropriately selected from the range of 95 by weight or less (e.g., 1 to 95% by weight, 1 to 90% by weight, 1 to 85% by weight, 1 to 80% by weight, and 1 to 60% by weight) and 1% by weight or more (e.g., 1 to 95% by weight and 2 to 95% by weight).

When the additive is an ultraviolet absorbing agent, the concentration of the ultraviolet absorbing agent in the solution can be appropriately set according to the desired ultraviolet absorption properties to be imparted to the pressure-sensitive adhesive layer 10a and for example, can be selected from the range of, in terms of the upper limit, 50% by weight or less (e.g., 1 to 50% by weight, 1 to 45% by weight, 1 to 40% by weight, 1 to 35% by weight, 1 to 30% by weight, 1 to 25% by weight, 1 to 20% by weight, and 1 to 15% by weight); or in terms of the lower limit, 1% or more (e.g., 1 to 50% by weight, 2 to 50% by weight, 3 to 50% by weight, 4 to 50% by weight, and 5 to 50% by weight).

When the additive is a rust inhibitor, the concentration of the rust inhibitor in the solution can be appropriately set according to the desired rust inhibitory properties to be imparted to the pressure-sensitive adhesive layer 10a, and for example, can be selected from the range of, in terms of the upper limit, 10% by weight or less (e.g., 0.1 to 10% by weight, 0.1 to 9% by weight, 0.1 to 8% by weight, 0.1 to 7% by weight, 0.1 to 6% by weight, 0.1 to 5% by weight, and 0.1 to 4% by weight) or in terms of the lower limit, 0.1% or more (e.g., 0.1 to 10% by weight, 0.2 to 10% by weight, 0.3 to 10% by weight, 0.4 to 10% by weight, and 0.5 to 10% by weight).

When the additive is an antistatic agent, the concentration of the antistatic agent in the solution can be appropriately set according to the desired antistatic properties to be imparted to the pressure-sensitive adhesive layer 10a and for example, can be appropriately selected from the range, in terms of the upper limit, 95% by weight or less (e.g., 0.1 to 90% by weight, 0.1 to 9% by weight, 0.1 to 85% by weight, 0.1 to 80% by weight, 0.1 to 75% by weight, and 0.1 to 70% by weight); or in terms of the lower limit, 0.1% or more (e.g., 0.1 to 90% by weight, 0.2 to 90% by weight, 0.3 to 90% by weight, 0.4 to 90% by weight, 0.5 to 90% by weight, 0.6 to 90% by weight, and 1 to 90% by weight).

If the concentration of each of the above additives (crosslinking agent, ultraviolet absorbing agent, rust inhibitor, and antistatic agent) is higher than the above range, the additives may be bled out and distribution variations may occur from the viewpoint of application uniformity. If the concentration is lower than the above range, more solvent than necessary may be required, resulting in a decrease in adhesive properties due to residual solvent and appearance defects (uneven surface) due to swelling of the pressure-sensitive adhesive more than necessary.

For the application (coating) to the pressure-sensitive adhesive layer 10a in the solution 12, it is possible to use known coating processes, and examples thereof include a coater, such as a gravure roll coater a reverse roll coater, a kiss roll coater, a dip roll coater, a bar coater, a knife coater, a spray coater, a comma coater, or a direct coater.

The amount of the additive in the solution applied to the pressure-sensitive adhesive layer 10a can be appropriately set according to the desired required characteristics to be imparted to the pressure-sensitive adhesive layer 10a and for example, can be selected from the range of 1 to 1000 μg/cm$^2$, preferably 1 to 500 μg/cm$^2$, more preferably 1 to 300 μg/cm$^2$, and even more preferably 1 to 100 μg/cm$^2$. If the amount of the additive in the solution applied is within this range, the additive can be dissolved, and the required characteristics may be sufficiently imparted to the pressure-sensitive adhesive layer 10a.

After the solution of the additive is applied to the pressure-sensitive adhesive layer 10a, it may be allowed to stand to cause the additive to infiltrate, if necessary. The standing time is not particularly limited, and can be appropriately selected, for example, within 15 minutes and can be selected from the range of, for example, 1 second to 10 minutes and preferably 5 seconds to 5 minutes. The standing temperature can be room temperature (approximately 10 to 30° C.). When allowed to stand under the above conditions, the additive can sufficiently infiltrate the pressure-sensitive adhesive layer 10a.

A heat-drying temperature in the drying step is preferably 40 to 200° C., more preferably 50 to 180° C., and even more preferably 60 to 170° C. The drying time may be adopted as appropriate and is, for example, 5 seconds to 20 minutes, preferably 5 seconds to 10 minutes, and more preferably 10 seconds to 5 minutes. The pressure-sensitive adhesive layer 10a can be returned to a state close to that before application by drying it under the above conditions.

If necessary, the standing time may be designed to make the additive and the pressure-sensitive adhesive layer more uniform. The standing time is not particularly limited, and can be appropriately selected, for example, within 30 days, and can be appropriately selected, for example, between 1 hour and 15 days and preferably between 24 hours and 10 days. The additive and the pressure-sensitive adhesive layer are stabilized in the pressure-sensitive adhesive layer 10a by allowing it to stand, thereby suppressing variation in characteristic evaluation.

FIG. 2(a) is a cross-sectional view illustrating one embodiment of the pressure-sensitive adhesive sheet according to the third aspect of the present invention, and FIG. 2(b) is a cross-sectional view illustrating another embodiment of the pressure-sensitive adhesive sheet according to the third aspect of the present invention.

Referring to FIG. 2(a), a pressure-sensitive adhesive sheet 2A according to one embodiment of the present invention is composed of: an optically transparent pressure-sensitive adhesive layer 21, wherein no support is laminated onto one of opposite principal surfaces, a first principal 21a, of the pressure-sensitive adhesive layer 21; and a support S1 being a release sheet laminated onto the other principal surface, a second principal surface 21b, of the pressure-sensitive adhesive layer 21.

Referring to FIG. 2(b) a pressure-sensitive adhesive sheet 2B according to one embodiment of the present invention is composed of: an optically transparent pressure-sensitive adhesive layer 21; a first support S2 being a release sheet laminated onto one of opposite principal surfaces, a first principal 21a, of the pressure-sensitive adhesive layer 21; and a second support S1 being a release sheet laminated onto the other principal surface, a second principal surface 21b, of the pressure-sensitive adhesive layer 21. The pressure-sensitive adhesive sheet 2B can be obtained by laminating the support S2 onto the first principal surface 21a of the pressure-sensitive adhesive sheet 2A.

In FIGS. 2(a) and (b), the dotted line X-X' is a line dividing the pressure-sensitive adhesive layer 21 into two equal portions in a thickness direction. When the thickness of the pressure-sensitive adhesive layer 21 is not uniform, the dotted line X-X' is a line bisecting the thickness at each point.

Figure 2:
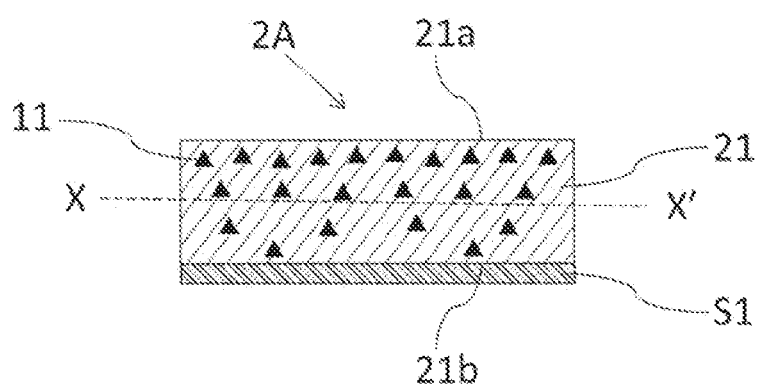
FIG. 2(a) is a cross-sectional view illustrating one embodiment of the pressure-sensitive adhesive sheet according to the present invention.
FIG. 2(b) is a cross-sectional view illustrating another embodiment of the pressure-sensitive adhesive sheet according to the present invention.
Figure 2:
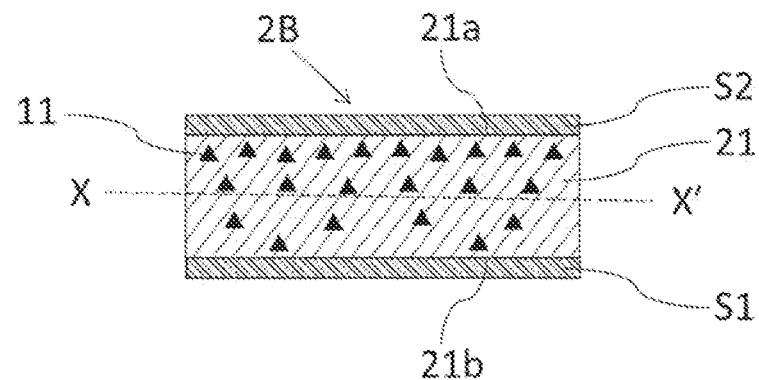

In FIG. 2, the pressure-sensitive adhesive layer 21 is a single layer comprising a transparent base pressure-sensitive adhesive material and having two opposite principal surfaces (first and second principal surfaces). The pressure-sensitive adhesive layer 21 is formed through the pressure-sensitive adhesive layer forming step and the pressure-sensitive adhesive layer curing step and is equivalent to the pressure-sensitive adhesive layer 10a in FIG. 1. Therefore, the pressure-sensitive adhesive layer 21 is preferably a cured pressure-sensitive adhesive layer.

The "single layer" of the pressure-sensitive adhesive layer means that it does not have a laminated structure. For example, a formation of a pressure-sensitive adhesive layer comprising a transparent base pressure-sensitive adhesive material with a pressure-sensitive adhesive layer comprising the same transparent base pressure-sensitive adhesive material formed thereon has a laminated structure, not a single layer. Similarly, a formation of a pressure-sensitive adhesive layer comprising a transparent base pressure-sensitive adhesive material in which additives are dissolved with a pressure-sensitive adhesive layer comprising a transparent base pressure-sensitive adhesive material in which additives are dissolved at different concentrations formed thereon has a laminated structure, not a single layer.

The thickness of the pressure-sensitive adhesive layer 21 is not particularly limited but is typically 5 μm to 500 μm, preferably 5 μm to 400 μm, even more preferably 5 μm to 350 μm. If the thickness of the pressure-sensitive adhesive layer 21 is in this range, it is preferable to form a concentration gradient of the additives in the thickness direction of the pressure-sensitive adhesive layer 21.

As measured according to JIS K7361, total light transmittance of the entire pressure-sensitive adhesive layer 21 is not particularly limited but is preferably 80% or more and preferably 90% or more. The higher total light transmittance of the pressure-sensitive adhesive layer 21 provides better results. Furthermore, a haze value thereof is preferably 1.5% or less and more preferably 1% or less.

The additive 11 is dissolved in the pressure-sensitive adhesive layer 21. Herein, "dissolution" means, for example, that the additive dissolves to such an extent that the transparency of the pressure-sensitive adhesive layer can be maintained, i.e., white turbidity caused by light scattering of the additive does not occur. Specifically, the additive is preferably contained in the pressure-sensitive adhesive layer so that the haze value of the pressure-sensitive adhesive layer is 1.5% or less, and preferably 1% or less.

The additive 11 is formed by causing the additive 11 to infiltrate pressure-sensitive adhesive layer 21 through the solution application step, the solution infiltration step, and the drying step, and as illustrated in FIG. 2, a concentration gradient of the additive 11 may occur in the thickness direction of the pressure-sensitive adhesive layer 21. Therefore, in a case where the single pressure-sensitive adhesive layer 21 is divided into two equal portions in a thickness direction, the concentration of the additive in the area to which one of the two principal surfaces, the first principal surface 21a, belongs is different from the concentration of the additive in the area to which the other principal surface, the second principal surface 21b, belongs. The scope of the present invention also includes a case where no additive is present in a region where the concentration of the additive is lower (the concentration of the additive is 0).

The concentration of the additive in the area to which the first principal surface belongs and the concentration of the additive in the area to which the second principal surface belongs mean the average concentration of the additives in each region if there is also a concentration gradient in each region.

FIG. 2(a) illustrates an embodiment in which the second principal surface 21b faces the support S1, and the concentration of the additive in the area to which the first principal surface 21a belongs is higher than the concentration of the additive in the area to which the second principal surface 21b belongs, and this can be obtained by applying a solution of the additive to the first principal surface 21a to cause the additive into the pressure-sensitive adhesive layer 21 to infiltrate in a dissolved state from the first principal surface 21a over a depth in the thickness direction.

In the pressure-sensitive adhesive sheet according to the third aspect of the present invention, additives such as a rust inhibitor and an antistatic agent are distributed in high concentration near the first principal surface 21a, as illustrated in FIGS. 2(a) to (b), thereby imparting the required characteristics such as antirust function or antistatic function by the additives to the first principal surface 21a. On the other hand, since the concentration of the additive 11 in the entire pressure-sensitive adhesive layer 21 can be lowered, a change in the physical properties of the pressure-sensitive adhesive layer 21 due to additive 11 can be reduced.

The pressure-sensitive adhesive sheet according to the third aspect of the present invention can be used for bonding a transparent optical element to another optical element in an image display device, such as a liquid crystal image display device or an organic EL image display device. Examples of the optical elements include various types of transparent optical elements, such as a polarizing film, a retardation film, and a transparent cover element including a cover glass. The optical elements of the present invention may also include a glass substrate in which a transparent electroconductive layer such as a patterned ITO film is formed. The pressure-sensitive adhesive sheet according to the third aspect of the present invention may also be used suitably as a surface protection film to prevent scratches or adherence of stains on the optical elements.

FIG. 3 is a cross-sectional view of an optical element laminate presented as one example of the simplest embodiment using a pressure-sensitive adhesive sheet according to the present invention. Referring to FIG. 3, the optical element laminate 3 is composed of: an optically transparent, first optical element 31; and a second optical element 32 bonded to the first optical element 31 through an optically transparent pressure-sensitive adhesive layer 21. The optical element laminate 3 is obtained by peeling off the supports S1 and S2 from the pressure-sensitive adhesive sheet 2B illustrated in 2(b) to laminate them to the first and second optical elements. The transparent, first optical element 31 and second optical element 32 may be composed of: an optical film for use in an optical display device, such as a polarizing film or a retardation film; or a transparent cover element such as a viewing-side cover glass of an optical display device. The first optical element 31 and the second optical element 32 are respectively bonded to the first principal surface 21a and the second principal surface 21b of the pressure-sensitive adhesive layer 21.

FIGS. 4(a) to (d) are is-views schematically illustrating a process for implementing one embodiment of a method for producing an optical element laminate according to the second aspect of the present invention. In the present embodiment, a substrate 42 comprising an adhesive sheet 2C and an optical element (hereinafter, sometimes referred to simply as "substrate 42") is used, as illustrated in FIG. 4(a).

In the present embodiment, the adhesive sheet 2C is produced by the method for producing the pressure-sensitive adhesive sheet according to the first aspect of the present invention, which is a hybrid adhesive sheet, and specifically produced by the following method including:

forming a pressure-sensitive adhesive layer formed of a transparent base pressure-sensitive adhesive material containing a first polymerization initiator and a first crosslinking agent on a support;

curing the pressure-sensitive adhesive layer by a reaction between the first polymerization initiator and the first crosslinking agent;

providing a solution of at least one additive selected from the group consisting of a second polymerization initiator and a second crosslinking agent;

applying the solution to one of opposite surfaces of the cured pressure-sensitive adhesive layer to cause the additive contained in the solution to infiltrate from the one surface in a thickness direction of the pressure-sensitive adhesive layer; and drying the pressure-sensitive adhesive layer.

In the adhesive sheet 2C in FIG. 4), a pressure-sensitive adhesive layer 41 in the present embodiment is cured by a reaction between the first polymerization initiator and the first crosslinking agent (not shown), and a second polymerization initiator 11a and a second crosslinking agent 11b are dispersed in a dissolved state. The present invention encompasses an embodiment in which either one of the second polymerization initiator 11a and the second crosslinking agent 11b is dissolved in the pressure-sensitive adhesive layer 41.

In the present embodiment, the adhesive sheet 2C has a support S3 but may not have the support S3. In the present embodiment, there is a concentration gradient of the second polymerization initiator 11a and the second crosslinking agent 11b in a thickness direction from a principal surface 41a in which the pressure-sensitive adhesive layer 41 is in contact with the support S3.

In a substrate 42 in FIG. 4(a), a principal surface 42a bonded to the adhesive sheet 2C in the present embodiment have a printed layer 43. The printed layer 43 includes a transparent electroconductive printed layer such as a patterned ITO (Indium Tin Oxide) and a black concealing portion formed in a frame shape in a peripheral edge portion of a transparent cover element. The present invention also encompasses the case where a substrate 42 without the printed layer 43 is used.

Next, the pressure-sensitive adhesive layer 41 of the pressure-sensitive adhesive sheet 2C is bonded to the principal surface 42a of the substrate 42. The bonding can be performed by a known method, for example, under heating and pressurizing conditions using an autoclave. The pressure-sensitive adhesive layer 41 of the pressure-sensitive adhesive sheet 2C is cured by a reaction between the first polymerization initiator and the first crosslinking agent (first trigger) but is in a state before the curing reaction by at least one selected from the group consisting of the second polymerization initiator 11a and the second crosslinking agent 11b (second trigger) proceeds, so the pressure-sensitive adhesive layer 41 exhibits high fluidity and excellent level difference absorbability. Therefore, the pressure-sensitive adhesive layer 41 is bonded so as to fill up a stepped space between the principal surface 42a of the substrate 42 and the printed layer 43.

Next, the pressure-sensitive adhesive layer 41 is cured by reaction of at least one selected from the group consisting of the second polymerization initiator 11a and the second crosslinking agent 11b (second trigger). The methods of curing the pressure-sensitive adhesive layer 41 are not particularly limited as long as the curing reaction proceeds by the second trigger, and examples thereof include heating the pressure-sensitive adhesive layer 41 and curing the pressure-sensitive adhesive layer 41 by irradiation with the active energy ray. If necessary, the methods may further include heating and drying. Examples of the active energy ray include ionizing radiations such as an α-ray, a β-ray, a γ-ray, a neutron ray, an electron ray, and ultraviolet rays, and particularly, the ultraviolet rays are preferable.

The conditions for curing the pressure-sensitive adhesive layer 41, for example, the heating temperature and time or the irradiation dose of the active energy rays, may be set appropriately so as to exhibit high elastic modulus and excellent adhesive reliability.

FIG. 4(c) is an embodiment in which the pressure-sensitive adhesive layer 41 is cured by irradiating the pressure-sensitive adhesive layer 41 with ultraviolet rays U. The irradiation with the ultraviolet rays U decomposes the second polymerization initiator 11a and generates radicals, ions, or the like to initiate polymerization and crosslinking reaction of the second crosslinking agent 11b. The pressure-sensitive adhesive layer 41 may be directly irradiated with the ultraviolet rays or may be irradiated through the support S3. FIG. 4(c) is an embodiment in which the pressure-sensitive adhesive layer 41 is irradiated with ultraviolet rays U through the support S3. When the pressure-sensitive adhesive layer 41 is directly irradiated with the ultraviolet rays, ultraviolet rays U may be irradiated after the support S3 is removed from the pressure-sensitive adhesive layer 41.

As illustrated in FIG. 4(d), an optical element laminate 4 is obtained by curing the pressure-sensitive adhesive layer 41. In FIG. 4(d), 41c is a pressure-sensitive adhesive layer in which the pressure-sensitive adhesive layer 41 is cured. The optical element laminate 4 is an embodiment of an example of the optical element laminate according to the fourth aspect of the present invention.

The crosslinking agent 11b is crosslinked and polymerized to form a crosslinked structure 11c by curing the pressure-sensitive adhesive layer 41, thereby forming a pressure-sensitive adhesive layer 41c. The pressure-sensitive adhesive layer 41c has an improved elastic modulus and improved adhesive reliability to the substrate 42. Therefore, the pressure-sensitive adhesive layer 41c suppresses the generation of gas such as carbon dioxide due to heating of the substrate 42 (plastic film) and prevents the formation of bubbles.

In the embodiment of FIG. 4(d), the crosslinking density on a side of the principal surface 41a, in which the pressure-sensitive adhesive layer 41c is in contact with the support S3, is higher than the principal surface 41b on the opposite side. This configuration is preferable in that its bendability can be improved, for example, when the optical element laminate 4 is used as a flexible image display device bending the side of the principal surface 41a to the outside.

In other words, when a flexible display is bent, tensile stress is generally applied to the outside while compressive stress is applied to the inside, with the outside stress being greater than the inside stress. Therefore, durability against bending can be improved by disposing the principal surface 41a of the pressure-sensitive adhesive layer 41c on the outside of the flexible display when it is bent.

The optical element laminate 4 in the present embodiment has, for example, the following configuration.

The optical element laminate 4 includes a substrate 42 comprising an optical element and a pressure-sensitive adhesive layer 41c, wherein:

the pressure-sensitive adhesive layer 41c is laminated on a principal surface of a substrate 43 comprising an optical element;

the pressure-sensitive adhesive layer 41c is a single layer comprising a transparent base pressure-sensitive adhesive material cured by a reaction between the first polymerization initiator and the first crosslinking agent (first trigger) and a reaction of at least one selected from the group consisting of the second polymerization initiator 11a and the second crosslinking agent 11b (second trigger), and having two opposite principal surfaces; and in a case where the single pressure-sensitive adhesive layer is divided into two equal portions in a thickness direction, the density of a crosslinking agent 11c in an area to which one of the two principal surfaces, a first principal surface 41a, belongs is different from the density of the crosslinking agent 11c in an area to which the other principal surface, a second principal surface 41b, belongs.

In the present embodiment, the pressure-sensitive adhesive layer 41c is laminated so as to fill up a stepped space between the principal surface 42a of the substrate 42 and the printed layer 43.

EXAMPLES

The present invention will be described in more detail below based on Examples, but the present invention is not limited to these Examples.

(Preparation of Pressure-Sensitive Adhesive Sheet A)

To a monomer mixture composed of 66 parts by weight of 2-ethylhexyl acrylate (2EHA), 19 parts by weight of 2-hydroxyethyl acrylate (HEA), and 15 parts by weight of N-vinyl-2-pyrrolidone (NVP) was incorporated 0.035 parts by weight of a photopolymerization initiator (trade name "IRGACURE 184", manufactured by BASF) and 0.035 parts by weight of a photopolymerization initiator (trade name "IRGACURE 651", manufactured by BASF). The resultant was then irradiated with ultraviolet rays until the viscosity thereof (measuring conditions: a BH viscometer No. 5 rotor; 10 rpm; and measuring temperature: 30° C.) turned to about 20 Pas to yield a prepolymer composition in which the monomer components were partially polymerized.

Next, to the prepolymer composition was added 0.2 parts by weight of hexanediol diacrylate (HDDA) and mixed to yield an acrylic pressure-sensitive adhesive composition. The above acrylic pressure-sensitive adhesive composition was applied onto a release-treated surface of a release film (trade name: "MRF #38", manufactured by Mitsubishi Plastics, Inc.) such that the thickness thereof after being formation of a pressure-sensitive adhesive layer becomes 100 µm to form a pressure-sensitive adhesive composition layer. Then, a release film (trade name: "MRN #38", manufactured by Mitsubishi Plastics, Inc.) was laminated onto a surface of the pressure-sensitive adhesive composition layer. Thereafter, the pressure-sensitive adhesive composition layer was light-cured by performing irradiation with ultraviolet rays under conditions of an illuminance of 5 mW/cm$^2$ and a light quantity of 1500 mJ/cm$^2$ to form a pressure-sensitive adhesive sheet A.

(Preparation of Pressure-Sensitive Adhesive Sheet B)

A pressure-sensitive adhesive sheet B was formed in the same manner as the pressure-sensitive adhesive sheet A except that the amount of hexanediol diacrylate (HDDA) added was set to 0.1 parts by weight.

(Preparation of Pressure-Sensitive Adhesive Sheet C)

A pressure-sensitive adhesive sheet C was formed in the same manner as the pressure-sensitive adhesive sheet A, except that 96 parts by weight of butyl acrylate (BA) and 4 parts by weight of acrylic acid (AA) were used as the monomer mixture; 0.1 parts by weight of 2-hydroxyethyl acrylate (HEA) was used instead of hexanediol diacrylate (HDDA); and a thickness thereof after being formed as a pressure-sensitive adhesive layer was set to 23 µm.

(Preparation of Pressure-Sensitive Adhesive Sheet D)

A pressure-sensitive adhesive sheet D was formed in the same manner as the pressure-sensitive adhesive sheet A, except that 57 parts by weight of butyl acrylate (BA), 23 parts by weight of 4-hydroxybutyl acrylate (4HBA), 8 parts by weight of 2-hydroxyethyl acrylate (HEA), and 12 parts by weight of cyclohexyl acrylate (CHA) were used as the monomer mixture; 0.02 parts by weight of dipentaerythritol hexaacrylate (DPHA) was used instead of hexanediol diacrylate (HDDA); and a thickness thereof after being formed as a pressure-sensitive adhesive layer was set to 150 µm.

(Preparation of Pressure-Sensitive Adhesive Sheet E)

A pressure-sensitive adhesive sheet E was formed in the same manner as the pressure-sensitive adhesive sheet A, except that 29 parts by weight of 2-ethylhexyl acrylate (2EHA), 21 parts by weight of 4-hydroxybutyl acrylate (4HBA), 29 parts by weight of isostearyl acrylate (ISTA), and 21 parts by weight of isobornyl acrylate (IBXA) were used as the monomer mixture.

(Preparation of Pressure-Sensitive Adhesive Sheet F)

A pressure-sensitive adhesive sheet F was formed in the same manner as the pressure-sensitive adhesive sheet A, except that 41 parts by weight of 2-ethylhexyl acrylate (2EHA), 1 part by weight of 4-hydroxybutyl acrylate (4HBA), 17 parts by weight of N-vinyl-2-pyrrolidone (NVP), and 41 parts by weight of isostearyl acrylate (ISTA) were used as the monomer mixture; and 0.02 parts by weight of trimethylolpropane triacrylate (TMPTA) was used instead of hexanediol diacrylate (HDDA).

(Preparation of Pressure-Sensitive Adhesive Sheet G)

A pressure-sensitive adhesive sheet G was formed in the same manner as the pressure-sensitive adhesive sheet A, except that 57 parts by weight of butyl acrylate (BA), 23 parts by weight of 4-hydroxybutyl acrylate (4HBA), 8 parts by weight of 2-hydroxyethyl acrylate (HEA), and 12 parts by weight of cyclohexyl acrylate (CHA) were used as the monomer mixture; 0.03 parts by weight of dipentaerythritol hexaacrylate (HEA) was used instead of hexanediol diacrylate (HDDA); and a thickness thereof after being formed as a pressure-sensitive adhesive layer was set to 250 μm.

Example 1

A release film was removed from one of opposite principal surfaces (referred to as "first surface") of the pressure-sensitive adhesive sheet A, and the exposed first surface was coated with a 10% by weight concentration ethyl acetate solution of an ultraviolet absorbing agent (Tinosorb S, manufactured by BASF) by using a Wire Wound Rod type, No. 7 bar coater, manufactured by RD Specialties (target wet applying thickness: 15 μm). After application, the pressure-sensitive adhesive sheet A was heated and dried in an oven at 110° C. for 2 minutes, and then the solvent was volatilized and eliminated to yield a pressure-sensitive adhesive sheet A containing the pressure-sensitive adhesive layer in which the ultraviolet absorbing agent was dissolved.

Comparative Example 1

The release film was removed from the first surface of the pressure-sensitive adhesive sheet A to prepare the pressure-sensitive adhesive sheet A to which no solution of the ultraviolet absorbing agent is applied as Comparative Example 1.

Example 2

A pressure-sensitive adhesive sheet B containing a pressure-sensitive adhesive layer in which an ultraviolet absorbing agent (Tinuvin 928, manufactured by BASF) was dissolved was obtained in the same manner as in Example 1, except that the pressure-sensitive adhesive sheet B was used and an ethyl acetate solution of the ultraviolet absorbing agent in a concentration of 12% by weight was applied thereto.

Example 3

A pressure-sensitive adhesive layer B in which an ultraviolet absorbing agent (Tinuvin 928, manufactured by BASF) was dissolved was obtained in the same manner as in Example 1, except that the pressure-sensitive adhesive sheet B was used and a methyl ethyl ketone solution of the ultraviolet absorbing agent in a concentration of 12% by weight was applied thereto.

Example 4

A pressure-sensitive adhesive sheet B containing a pressure-sensitive adhesive layer in which an ultraviolet absorbing agent (Seesorb 106, manufactured by SHIPRO KASEI KAISHA, LTD.) was dissolved was obtained in the same manner as in Example 1, except that the pressure-sensitive adhesive sheet B was used and an ethyl acetate solution of the ultraviolet absorbing agent in a concentration of 15% by weight was applied thereto.

Comparative Example 2

The release film was removed from the first surface of the pressure-sensitive adhesive sheet B to prepare the pressure-sensitive adhesive sheet B to which no solution of the ultraviolet absorbing agent is applied as Comparative Example 2.

Example 5

A pressure-sensitive adhesive sheet C containing a pressure-sensitive adhesive layer in which an ultraviolet absorbing agent (Tinosorb S, manufactured by BASF) was dissolved was obtained in the same manner as in Example 1 except that the pressure-sensitive adhesive sheet C was used.

Example 6

A pressure-sensitive adhesive sheet C containing a pressure-sensitive adhesive layer in which an ultraviolet absorbing agent (Tinuvin 928, manufactured by BASF) was dissolved was obtained in the same manner as in Example 1, except that the pressure-sensitive adhesive sheet C was used, and an ethyl acetate solution of the ultraviolet absorbing agent in a concentration of 12% by weight was applied thereto.

Example 7

A pressure-sensitive adhesive sheet C containing a pressure-sensitive adhesive layer in which an ultraviolet absorbing agent (Tinuvin 928, manufactured by BASF) was dissolved was obtained in the same manner as in Example 1, except that the pressure-sensitive adhesive sheet C was used, and a methyl ethyl ketone solution of the ultraviolet absorbing agent in a concentration of 12% by weight was applied thereto.

Example 8

A pressure-sensitive adhesive sheet C containing a pressure-sensitive adhesive layer in which an ultraviolet absorbing agent (Seesorb 106, manufactured by SHIPRO KASEI KAISHA, LTD.) was dissolved was obtained in the same manner as in Example 1, except that the pressure-sensitive adhesive sheet C was used and an ethyl acetate solution of the ultraviolet absorbing agent in a concentration of 15% by weight was applied thereto.

Comparative Example 3

The release film was removed from the first surface of the pressure-sensitive adhesive sheet C to prepare the pressure-sensitive adhesive sheet C to which no solution of the ultraviolet absorbing agent is applied as Comparative Example 3.

Comparative Example 4

A pressure-sensitive adhesive sheet C containing no ultraviolet absorbing agent was obtained in the same manner as in Example 1, except that the pressure-sensitive adhesive sheet C was used and ethyl acetate containing no ultraviolet absorbing agent was applied thereto.

Example 9

A pressure-sensitive adhesive sheet D containing a pressure-sensitive adhesive layer in which an ultraviolet absorbing agent (Tinosorb S, manufactured by BASF) was dissolved was obtained in the same manner as in Example 1 except that the pressure-sensitive adhesive sheet D was used.

Comparative Example 5

The release film was removed from the first surface of the pressure-sensitive adhesive sheet D to prepare the pressure-sensitive adhesive sheet D to which no solution of the ultraviolet absorbing agent is applied as Comparative Example 5.

Example 10

A pressure-sensitive adhesive sheet E containing a pressure-sensitive adhesive layer in which an ultraviolet absorbing agent (Tinosorb S, manufactured by BASF) was dissolved was obtained in the same manner as in Example 1 except that the pressure-sensitive adhesive sheet E was used.

Comparative Example 6

The release film was removed from the first surface of the pressure-sensitive adhesive sheet F to prepare the pressure-sensitive adhesive sheet E to which no solution of the ultraviolet absorbing agent is applied as Comparative Example 6.

Example 11

A pressure-sensitive adhesive sheet F containing a pressure-sensitive adhesive layer in which an ultraviolet absorbing agent (Tinosorb S, manufactured by BASF) was dissolved was obtained in the same manner as in Example 1 except that the pressure-sensitive adhesive sheet F was used.

Comparative Example 7

The release film was removed from the first surface of the pressure-sensitive adhesive sheet F to prepare the pressure-sensitive adhesive sheet F to which no solution of the ultraviolet absorbing agent is applied as Comparative Example 7.

Comparative Example 8

A pressure-sensitive adhesive sheet F containing no ultraviolet absorbing agent was obtained in the same manner as in Example 1, except that the pressure-sensitive adhesive sheet F was used and ethyl acetate containing no ultraviolet absorbing agent was applied thereto.

Comparative Example 9

A pressure-sensitive adhesive sheet having a pressure-sensitive adhesive layer in which an ultraviolet absorbing agent (Tinosorb S, manufactured by BASF) was uniformly dissolved was obtained in the same manner as the pressure-sensitive adhesive sheet D, except that 70 parts by weight of butyl acrylate (BA), 14 parts by weight of 4-hydroxybutyl acrylate (4HBA), and 16 parts by weight of N-vinyl-2-pyrrolidone (NVP) were used as a monomer mixture; and 0.0009 parts by weight of the ultraviolet absorbing agent was incorporated into an acrylic pressure-sensitive adhesive composition.

<Transmittance Evaluation>

The release films of the pressure-sensitive adhesive sheets obtained in Examples 1 to 11 and Comparative Examples 1 to 8 were each peeled off and evaluated using a spectrophotometer (U4100, manufactured by Hitachi High-Tech Science Corporation) for optical wavelength-based transmittance (wavelength range: 300 to 800 nm). Transmittance (%) at 380 nm and 420 nm are shown in Table 1.

<Adhesive Strength Evaluation>

The release films of the pressure-sensitive adhesive sheets obtained in Examples 1 to 11 and Comparative Examples 1 to 8 were each peeled off. The surface to which the ultraviolet absorbing agent solution was applied is the first surface, while the opposite principal surface is the second surface.

The obtained pressure-sensitive adhesive sheets were each cut into a width of 100 mm and a length of 100 mm, the first or the second surface was laminated onto alkali glass, and a PET film (thickness: 25 μm) was laminated onto the opposite surface and pressed by a hand roller, then heated and pressurized (5 atm, 50° C.) in an autoclave for 15 minutes. The test piece thus obtained was measured for the adhesive strength (N/10 mm) using an autograph (tensile speed: 60 mm/min; peeling angle:180°). Three test pieces were prepared for each condition in the measurement, and their number average values were taken. Adhesive strength (N/10 mm) of the first and second surfaces to the alkali glass and the difference between them are shown in Table 1.

TABLE 1

| | Pressure-sensitive adhesive sheet | Ultraviolet absorbing agent solution | | | Adhesive strength [N/10 mm] | | | Transmittance [%] | |
|---|---|---|---|---|---|---|---|---|---|
| | | Ultraviolet absorbing agent | Solvent | Concentration [w %] | First surface | Second surface | Difference* | 380 nm | 420 nm |
| Example 1 | A | Tinosorb S | Ethyl acetate | 10 | 5.9 | 6.8 | 0.9 | 3.2 | 90.9 |
| Comparative Example 1 | | | Uncoated | | 5.6 | 5.9 | 0.3 | 92.1 | 92.3 |
| Example 2 | B | Tinuvin928 | Ethyl acetate | 12 | 7.0 | 7.2 | 0.2 | 6.9 | 90.9 |
| Example 3 | | Tinuvin928 | Methyl ethyl ketone | 12 | 7.2 | 7.3 | 0.1 | 7.1 | 90.9 |
| Example 4 | | Seesorb106 | Ethyl acetate | 15 | 8.6 | 7.7 | −0.9 | 0.0 | 86.7 |
| Comparative Example 2 | | | Uncoated | | 6.0 | 6.5 | 0.5 | 90.2 | 91.2 |
| Example 5 | C | Tinosorb S | Ethyl acetate | 10 | 2.2 | 2.3 | 0.1 | — | — |
| Example 6 | | Tinuvin928 | Ethyl acetate | 12 | 2.5 | 2.5 | 0.0 | 8.0 | 91.2 |
| Example 7 | | Tinuvin928 | Methyl ethyl ketone | 12 | 2.6 | 2.5 | −0.1 | 6.3 | 91.1 |

TABLE 1-continued

| Pressure-sensitive adhesive sheet | Ultraviolet absorbing agent | Solvent | Concentration [w %] | Adhesive strength [N/10 mm] First surface | Second surface | Difference* | Transmittance [%] 380 nm | 420 nm |
|---|---|---|---|---|---|---|---|---|
| Example 8 | | Seesorb106 | Ethyl acetate | 15 | 2.9 | 2.8 | −0.1 | 0.0 | 87.8 |
| Comparative Example 3 | | | Uncoated | | 2.4 | 2.4 | 0.0 | 90.7 | 91.6 |
| Comparative Example 4 | | — | Ethyl acetate | 0 | 2.3 | 2.3 | 0.0 | — | — |
| Example 9 | D | Tinosorb S | Ethyl acetate | 10 | — | 5.5 | — | 5.5 | 90.2 |
| Comparative Example 5 | | | Uncoated | | — | 5.6 | — | 91.0 | 92.3 |
| Example 10 | E | Tinosorb S | Ethyl acetate | 10 | 7.7 | 8.0 | 0.3 | 1.8 | 90.8 |
| Comparative Example 6 | | | Uncoated | | 7.0 | 7.7 | 0.7 | 91.7 | 92.5 |
| Example 11 | F | Tinosorb S | Ethyl acetate | 10 | 8.4 | 8.7 | 0.3 | — | — |
| Comparative Example 7 | | | Uncoated | | 7.6 | 7.6 | 0.0 | — | — |
| Comparative Example 8 | | — | Ethyl acetate | 0 | 7.4 | 7.6 | 0.2 | — | — |

*(adhesive strength on second surface − adhesive strength on first surface)

From Table 1, it is clear that an excellent ultraviolet absorbing function can be imparted to a pressure-sensitive adhesive layer of the pressure-sensitive adhesive sheet cured by ultraviolet rays by applying an ultraviolet absorbing agent solution to the pressure-sensitive adhesive layer. The difference in the adhesive strength between the first and the second surfaces of the pressure-sensitive adhesive layer was 1.0 N/mm, and it can be seen that the difference in physical properties such as adhesive strength between the front and back of the pressure-sensitive adhesive layer can be minimized by applying a solution of the ultraviolet absorbing agent to the pressure-sensitive adhesive layer of the cured pressure-sensitive adhesive sheet.

<Evaluation of Distribution of Ultraviolet Absorbing Agent in the Thickness Direction Pressure-Sensitive Adhesive>

In order to examine a distribution state of the ultraviolet absorbing agent (Tinosorb S) in the thickness direction of Example 9 and Comparative Example 9, TOF-SIMS analysis (Ar gas cluster ion etching method) was performed. Samples used were stored for one month after preparation.

Figure 5A:
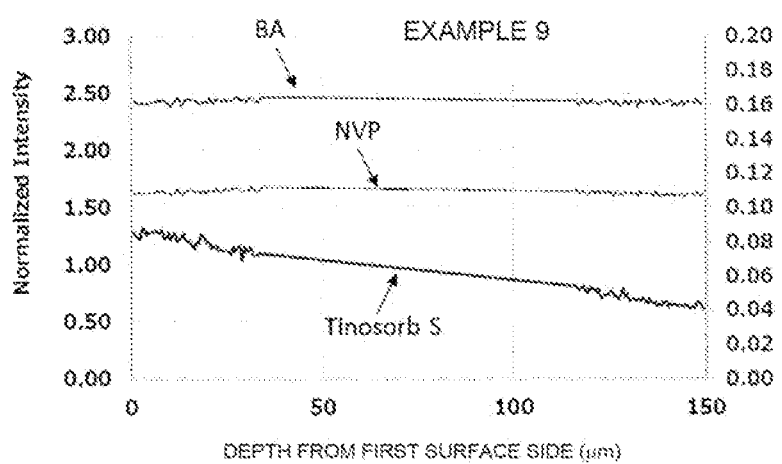
FIGS. 5(a) to (b) are graphs showing results of TOF-SIMS analysis on the pressure-sensitive adhesive sheets of Example 9 and Comparative Example 9.
Figure 5B:
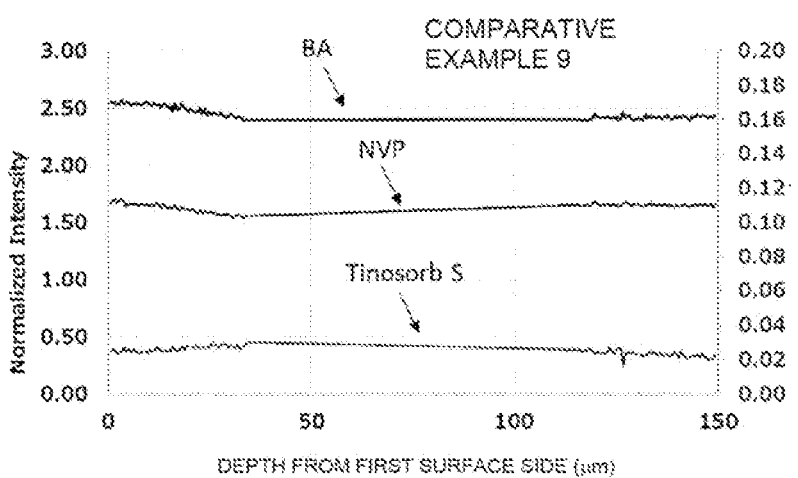

The release films of the pressure-sensitive adhesive sheets obtained in Examples 9 and Comparative Examples 9 were each peeled off, and TOF-SIMS analysis was performed from the first surface side under the following measurement conditions. Results are shown in. FIGS. 5(a) and (b). FIG. 5(a) shows the results of Example 9, and FIG. 5(b) shows the results of Comparative Example 9. In FIG. 5, the scale of the left vertical axis indicates the intensity of butyl acrylate (BA, $C_3+H_3+O_2$) and N-vinylpyrrolidone (NVP, $C4+H6+N+O$), and the scale of the right vertical axis indicates the intensity of the ultraviolet absorbing agent (Tinosorb S, $C_{30}+H_{32}+N_3+O_5$).

Analysis device: TOF-SIMS (manufactured by ULVAC-PHI, Inc., TRIFT V)
Etching ion: Ar gas cluster ion
Irradiated primary ion: $Bi_3^{2+}$
Acceleration voltage: 30 kV
Measurement polarity: negative ion From FIG. 5(a), it can be seen that the pressure-sensitive adhesive layer of the pressure-sensitive adhesive sheet of Example 9 has a concentration gradient of the ultraviolet absorbing agent (Tinosorb S) from the first surface to the second surface. On the other hand, from FIG. 5(b), it can be seen that the pressure-sensitive adhesive layer of the pressure-sensitive adhesive sheet of Comparative Example 9 has a constant concentration of the ultraviolet absorbing agent (Tinosorb S) distributed from the first surface to the second surface.

Example 12

A release film was removed from one of opposite principal surfaces (referred to as "first surface") of the pressure-sensitive adhesive sheet A, and the exposed first surface was coated with an ethyl acetate solution prepared by diluting hexanediol diacrylate (HDDA) to a concentration of 20% by weight and a photopolymerization initiator (Omnirad 184, manufactured by IGM Resins B.V.) to a concentration of 1% by weight by using a Wire Wound Rod type, #7 bar coater, manufactured by RD Specialties (target wet applying thickness: 15 μm). After application, the pressure-sensitive adhesive sheet A was heated and dried in an oven at 110° C. for 2 minutes, and then the solvent was volatilized and eliminated to yield a pressure-sensitive adhesive sheet A containing the pressure-sensitive adhesive layer in which HDDA was dissolved.

Example 13

A pressure-sensitive adhesive sheet B containing a pressure-sensitive adhesive layer in which the HDDA was dissolved was obtained in the same manner as in Example 12 except that the pressure-sensitive adhesive sheet B was used.

Example 14

A pressure-sensitive adhesive sheet G containing a pressure-sensitive adhesive layer in which dipentaerythritol hexaacrylate (DPHA) was dissolved was obtained in the same manner as in Example 12, except that the pressure-sensitive adhesive sheet G was used, and an ethyl acetate solution prepared by diluting DPHA to a concentration of 5% by weight and a photopolymerization initiator (Omnirad 184, manufactured by IGM Resins B.V.) to a concentration of 0.25% by weight was applied thereto.

Example 15

A pressure-sensitive adhesive sheet G containing a pressure-sensitive adhesive layer in which hexanediol diacrylate (HDDA) was dissolved was obtained in the same manner as in Example 12, except that the pressure-sensitive adhesive sheet G was used and an ethyl acetate solution prepared by diluting HDDA to a concentration of 2% by weight and a photopolymerization initiator (Omnirad 184, manufactured by IGM Resins B.V.) to a concentration of 0.1% by weight was applied thereto.

Example 16

A pressure-sensitive adhesive sheet G containing a pressure-sensitive adhesive layer in which hexanediol diacrylate (HDDA) was dissolved was obtained in the same manner as in Example 12, except that the pressure-sensitive adhesive sheet G was used and an ethyl acetate solution of HDDA in a concentration of 40% by weight and a photopolymerization initiator (Omnirad 184, manufactured by IGM Resins B.V.) in a concentration of 2% by weight was applied thereto.

Example 17

A pressure-sensitive adhesive sheet G containing a pressure-sensitive adhesive layer in which trimethylolpropane triacrylate (TMPTA) was dissolved was obtained in the same manner as in Example 12, except that the pressure-sensitive adhesive sheet G was used and an ethyl acetate solution of TMPTA in a concentration of 5% by weight and a photopolymerization initiator (Omnirad 184, manufactured by IGM Resins B.V.) in a concentration of 0.25% by weight was applied thereto.

<Elastic Modulus Evaluation>

The release films of the pressure-sensitive adhesive sheets obtained in Examples 12 to 17 were each peeled off, and the pressure-sensitive adhesive layers were laminated to a thickness of about 2 mm, which were used as samples for measurement. The dynamic viscoelasticity was measured under the following conditions using "Advanced Rheometric Expansion System (ARES)" manufactured by Rheometric Scientific, Inc.

(Measurement Conditions)
Deformation mode: torsion
Measurement frequency: 1 Hz
Temperature elevation rate: 5° C./minute
Shape: parallel plate 7.9 mmφ

Next, the above samples for measurement were irradiated with ultraviolet rays under the conditions of an illuminance of 300 mW/cm$^2$ and a cumulative light quantity of 3000 mJ/cm$^2$ for curing, and dynamic viscoelasticity was measured by the above method. The storage elastic modulus at 85° C. before and after curing is shown in Table 2.

17 are useful as hybrid adhesive sheets. From Examples 15 and 16, it can also be seen that the storage elastic modulus after curing can be controlled by adjusting the concentration of the crosslinking agent solution.

Example 18

A release film was removed from one of opposite principal surfaces (referred to as "first surface") of the pressure-sensitive adhesive sheet C, and the exposed first surface was coated with an ethanol solution of a rust inhibitor (1,2,3-benzotriazole) in a concentration of 0.5% by weight by using a Wire Wound Rod type, #7 bar coater, manufactured by RD Specialties (target wet applying thickness: 15 μm). After application, the pressure-sensitive adhesive sheet C was heated and dried in an oven at 110° C. for 2 minutes, and then the solvent was volatilized and eliminated to yield a pressure-sensitive adhesive sheet C containing the pressure-sensitive adhesive layer in which the rust inhibitor was dissolved.

Comparative Example 10

The release film was removed from the first surface of the pressure-sensitive adhesive sheet C to prepare the pressure-sensitive adhesive sheet C to which no solution of the rust inhibitor is applied as Comparative Example 10.

<Evaluation of Antirust Function>

The release films of the pressure-sensitive adhesive sheets obtained in Examples 18 and Comparative Examples 10 were each peeled off. The surface to which the rust inhibitor solution was applied is the first surface, while the opposite principal surface is the second surface. The obtained pressure-sensitive adhesive sheets were each cut into a width of 100 mm and a length of 100 mm, the first or the second surface was laminated onto a film with copper and a PET film (thickness: 25 μm) was laminated onto the opposite surface and pressed by a hand roller, then heated and pressurized (5 atm, 50° C.) in an autoclave for 15 minutes. The film with copper was a cycloolefin film (trade name: "ZEONOR (R) ZF16; thickness: 50 μm) with a hard coat layer formed on each of both surfaces thereof and a 50 nm copper layer formed by sputtering on one side thereof (surface resistance value: 0.58Ω/□). This was stored under environments of 85° C. and 85% RH for 500 hours and copper conditions were evaluated before and after storage.

TABLE 2

|  | Pressure-sensitive adhesive sheet | Crosslinking agent solution | | | Storage Elastic Modulus (85° C.) [MPa] | |
| --- | --- | --- | --- | --- | --- | --- |
|  |  | Crosslinking agent | Solvent | Concentration [w %] | Before curing | After curing |
| Example 12 | A | HDDA | Ethyl acetate | 20 | 94 | 110 |
| Example 13 | B | HDDA | Ethyl acetate | 20 | 68 | 80 |
| Example 14 | G | DPHA | Ethyl acetate | 5 | 89 | 99 |
| Example 15 |  | HDDA | Ethyl acetate | 2 | 99 | 100 |
| Example 16 |  |  | Ethyl acetate | 40 | 90 | 110 |
| Example 17 |  | TMPTA | Ethyl acetate | 5 | 91 | 92 |

In Examples 12 to 17, each storage elastic modulus is improved by subjecting pressure-sensitive adhesive sheets A, B, and G, in which the crosslinking agent solution is applied to pressure-sensitive adhesive layers thereof and then dried, to curing conditions. Therefore, it can be seen that the pressure-sensitive adhesive sheets of Examples 12 to The surface resistance value of copper was measured by a hall effect measuring device (Accent Optical Technologies, HL5500PC). The copper surface was also visually observed and evaluated for the presence or absence of corrosion. After storage, the rust inhibitor was checked under a microscope to see if it was detected. Results are shown in Table 3.

TABLE 3

| Pressure-sensitive adhesive sheet | Surface laminated to film with copper | Rust inhibitor solution | | | Surface resistance value [Ω/□] | | Presence or absence of corrosion | Detection of rust inhibitor |
|---|---|---|---|---|---|---|---|---|
| | | Rust inhibitor | Solvent | Concentration [w %] | Initial time | After 500 h | | |
| Example 18 | C | First surface Second surface | 1,2,3-benzotriazole | Ethanol | 0.5 | 0.59 0.59 | 0.54 0.63 | Absence Absence | Absence Absence |
| Comparative Example 10 | | Uncoated | | | 0.58 | 14.86 | Presence | Absence |

From Table 3, it is seen that a rust inhibitor function can be imparted to the pressure-sensitive adhesive by applying the rust inhibitor solution to the pressure-sensitive adhesive layer. In addition, the surface resistance value of the first surface 500 hours after application of the rust inhibitor solution thereto was lower than that of the second surface, suggesting that there is a difference in concentration of the rust inhibitor between the front and back.

Example 19

A release film was removed from one of opposite principal surfaces (referred to as "first surface") of the pressure-sensitive adhesive sheet C, and the exposed first surface was coated with an ethanol solution of an antistatic agent (lithium bis(trifluoromethanesulfonyl)imide) in a concentration of 5% by weight by using a Wire Wound Rod type, #7 bar coater, manufactured by RD Specialties (target wet applying thickness: 15 μm). After application, the pressure-sensitive adhesive sheet C was heated and dried in an oven at 110° C. for 2 minutes, and then the solvent was volatilized and eliminated to yield a pressure-sensitive adhesive sheet C containing the pressure-sensitive adhesive layer in which the antistatic agent was dissolved.

Example 20

A pressure-sensitive adhesive sheet C containing a pressure-sensitive adhesive layer in which the antistatic agent was dissolved was obtained in the same manner as in Example 19, except that the concentration of the antistatic agent solution was set to 10% by weight.

Example 21

A pressure-sensitive adhesive sheet C containing a pressure-sensitive adhesive layer in which the antistatic agent was dissolved was obtained in the same manner as in Example 19 except that the concentration of the antistatic agent solution was set to 20% by weight.

Comparative Example 11

The release film was removed from the first surface of the pressure-sensitive adhesive sheet C to prepare the pressure-sensitive adhesive sheet C to which no solution of the antistatic agent is applied as Comparative Example 11.
<Evaluation of Antistatic Function>

The release films of one of the opposite pressure-sensitive adhesive sheets obtained in Examples 19 to 21 and Comparative Examples 11 were each peeled off, and surface resistance values of the pressure-sensitive adhesive layers were measured under the following conditions. The principal surface to which the antistatic agent solution was applied is the first surface, while the opposite principal surface is the second surface. The results are shown in Table 4.

Measuring device: Hiresta MCP-HT450 (Nittoseiko Analytech Co., Ltd.)
Probe: URS
Applied voltage: 250 V

TABLE 4

| Pressure-sensitive adhesive sheet | Antistatic agent solution | | | Surface resistance value [×10⁹Ω] | |
|---|---|---|---|---|---|
| | Antistatic agent | Solvent | Concentration [w %] | First surface | Second surface |
| Example 19 | C | Lithium bis(trifluoromethanesulfonyl)imide | Ethanol | 5 | 7.90 | 5.37 |
| Example 20 | | | | 10 | 1.45 | 1.39 |
| Example 21 | | | | 20 | 0.27 | 0.25 |
| Comparative Example 11 | | Uncoated | | | OVER | OVER |

OVER: $10^{12}$ Ω or more

From Table 4, it is seen that an antistatic function can be imparted to the pressure-sensitive adhesive by applying the antistatic agent solution to the pressure-sensitive adhesive layer.

Example 22

A release film was removed from one of opposite principal surfaces (referred to as "first surface") of the pressure-sensitive adhesive sheet B, and the exposed first surface was coated with an ethyl acetate solution prepared by diluting an ultraviolet absorbing agent (Tinosorb S, manufactured by BASF) to a concentration of 10% by weight, hexanediol diacrylate (HDDA) to a concentration of 20% by weight, and a photopolymerization initiator (Omnirad 819, manufactured by IGM Resins B.V.) to a concentration of 0.3% by weight by using a Wire Wound Rod type, #7 bar coater, manufactured by RD Specialties (target wet applying thickness: 15 μm). After application, the pressure-sensitive adhesive sheet B was heated and dried in an oven at 110° C. for 2 minutes, and then the solvent was volatilized and eliminated to yield a pressure-sensitive adhesive sheet B containing the pressure-sensitive adhesive layer in which the ultraviolet absorbing agent and HDDA were dissolved.

Example 23

A pressure-sensitive adhesive sheet B containing a pressure-sensitive adhesive layer in which an ultraviolet absorbing agent (Tinuvin 928, manufactured by BASF) and hexanediol diacrylate (HDDA) were dissolved was obtained in the same manner as in Example 22, except an ethyl acetate solution prepared by diluting the ultraviolet absorbing agent to a concentration of 12% by weight, HDDA to a concentration of 30% by weight, and a photopolymerization initiator (Omnirad 819, manufactured by IGM Resins B.V.) to a concentration of 0.5% by weight was applied.

Example 24

A pressure-sensitive adhesive sheet B containing a pressure-sensitive adhesive layer in which hexanediol diacrylate (HDDA) was dissolved was obtained in the same manner as in Example 22, except that an ethyl acetate solution prepared by diluting HDDA to a concentration of 20% by weight and a photopolymerization initiator (Omnirad 819, manufactured by IGM Resins B.V.) to a concentration of 0.3% by weight was applied.

Example 25

A pressure-sensitive adhesive sheet B containing a pressure-sensitive adhesive layer in which hexanediol diacrylate (HDDA) was dissolved was obtained in the same manner as in Example 22, except that an ethyl acetate solution prepared by diluting HDDA to a concentration of 30% by weight and a photopolymerization initiator (Omnirad 819, manufactured by IGM Resins B.V.) to a concentration of 0.5% by weight was applied.

<Evaluation>

In the same manner as in Examples 12 to 17, the pressure-sensitive adhesive sheets obtained in Examples 22 to 25 were each allowed to stand for 7 days and then measured for the above "transmittance evaluation", "adhesive strength evaluation", and "elastic modulus evaluation". The transmittance and adhesive strength evaluations were carried out on the pressure-sensitive adhesive sheet before curing by ultraviolet irradiation. The results are shown in Table 5.

TABLE 5

| | | Example 22 | Example 23 | Example 24 | Example 25 |
|---|---|---|---|---|---|
| Pressure-sensitive adhesive sheet | | B | B | B | B |
| Additive solution | Solvent | Ethyl acetate | Ethyl acetate | Ethyl acetate | Ethyl acetate |
| | Ultraviolet absorbing agent (concentration) | Tinosorb S (10 wt %) | Tinuvin928 (12 wt %) | — | — |
| | Photopolymerization initiator (concentration) | Omnirad 819 (0.3 wt %) | Omnirad 819 (0.5 wt %) | Omnirad 819 (0.3 wt %) | Omnirad 819 (0.5 wt %) |
| | Crosslinking agent (concentration) | HDDA (20 wt %) | HDDA (30 wt %) | HDDA (20 wt %) | HDDA (30 wt %) |
| Adhesive strength (before curing) [N/10 mm] | First surface | 6.8 | 6.5 | 6.4 | 6.5 |
| | Second surface | 7.2 | 7.3 | 6.8 | 6.9 |
| | Difference | 0.4 | 0.7 | 0.3 | 0.4 |
| Transmittance (before curing) [%] | 380 nm | 3.9 | 6.7 | 90.0 | 89.8 |
| | 420 nm | 90.5 | 90.4 | 90.5 | 90.4 |
| Storage elastic modulus (85° C.) [MPa] | Before curing | 65 | 67 | 66 | 66 |
| | After curing | 84 | 85 | 78 | 77 |

It can be seen that the pressure-sensitive adhesive sheets of Example 22 and 23 to which a solution containing an ultraviolet absorbing agent in addition to a photopolymerization initiator and a crosslinking agent is applied have an increased storage elastic modulus after curing and thus improved adhesive reliability compared to the pressure-sensitive adhesive sheets of Examples 24 and 25 to which a solution not containing an ultraviolet absorbing agent. This is because the ultraviolet absorbing agent which absorbed the ultraviolet rays generated heat and accelerated the curing reaction.

Variations of the present invention will be supplementally described below.

Supplement 1

A method for producing a pressure-sensitive adhesive sheet, comprising:
  forming a pressure-sensitive adhesive layer formed of a transparent base pressure-sensitive adhesive material on a support;
  curing the pressure-sensitive adhesive layer;
  providing a solution of an additive;
  applying the solution to one of opposite surfaces of the cured pressure-sensitive adhesive layer to cause the additive contained in the solution to infiltrate from the one surface in a thickness direction of the pressure-sensitive adhesive layer; and
  drying the pressure-sensitive adhesive layer.

Supplement 2

The method for producing a pressure-sensitive adhesive sheet according to supplement 1, wherein
  the solution of the additive is a solution in which the additive is dissolved in a solvent, and
  the method comprises drying the pressure-sensitive adhesive layer to evaporate the solvent of the solution.

Supplement 3

The method for producing a pressure-sensitive adhesive sheet according to supplement 1 or 2, further comprising laminating a release sheet onto a surface of the pressure-sensitive adhesive layer on a side opposite to the support.

Supplement 4

The method for producing a pressure-sensitive adhesive sheet according to any one of supplements 1 to 3, wherein the additive is at least one selected from the group consisting of a polymerization initiator, a crosslinking agent, an ultraviolet absorbing agent, a rust inhibitor, and an antistatic agent.

Supplement 5

The method for producing a pressure-sensitive adhesive sheet according to supplement 4, wherein the additive is at least one selected from the group consisting of a polymerization initiator and a crosslinking agent.

Supplement 6

The method for producing a pressure-sensitive adhesive sheet according to supplement 5, wherein the additive further comprises an ultraviolet absorbing agent.

Supplement 7

The method for producing a pressure-sensitive adhesive sheet according to any one of supplements 1 to 6, wherein:
the base pressure-sensitive adhesive material contains a first polymerization initiator and a first crosslinking agent;
the curing is curing by a reaction between the first polymerization initiator and the first crosslinking agent; and
the additive is at least one selected from the group consisting of a second polymerization initiator and a second crosslinking agent.

Supplement 8

The method for producing a pressure-sensitive adhesive sheet according to supplement 7, wherein the first polymerization initiator is the same as the second polymerization initiator.

Supplement 9

A method for producing an optical element laminate, the optical element laminate comprising: a substrate comprising an optical element; and a pressure-sensitive adhesive layer, the method comprising:
bonding a pressure-sensitive adhesive layer of a pressure-sensitive adhesive sheet obtained by the method according to supplement 7 or 8 to a principal surface of the substrate comprising an optical element; and
curing the pressure-sensitive adhesive layer by reaction of at least one selected from the group consisting of the second polymerization initiator and the second crosslinking agent.

Supplement 10

The method for producing an optical element laminate according to supplement 9, wherein:
the principal surface of the substrate comprising an optical element has a printed layer; and
the pressure-sensitive adhesive layer is bonded so as to fill up a stepped space between the principal surface of the substrate comprising an optical element and the printed layer.

Supplement 11

A pressure-sensitive adhesive sheet having a support and a transparent pressure-sensitive adhesive layer on the support, wherein:
the pressure-sensitive adhesive layer is a single layer comprising a transparent base pressure-sensitive adhesive material and having two opposite principal surfaces;
an additive is dissolved in the pressure-sensitive adhesive layer; and
in a case where the single pressure-sensitive adhesive layer is divided into two equal portions in a thickness direction,
a concentration of the additive in an area to which one of the two principal surfaces, a first principal surface, belongs is different from a concentration of the additive in an area to which the other principal surface, a second principal surface, belongs.

Supplement 12

The pressure-sensitive adhesive sheet according to supplement 11, wherein the pressure-sensitive adhesive layer is a cured pressure-sensitive adhesive layer.

Supplement 13

The pressure-sensitive adhesive sheet according to supplement 11 or 12, wherein the second principal surface faces the support, and the concentration of the additive in the area to which the first principal surface belongs is higher than the concentration of the additive in the area to which the second principal surface belongs.

Supplement 14

The pressure-sensitive adhesive sheet according to any one of supplements 11 to 13, wherein the single pressure-sensitive adhesive layer has a concentration gradient of the additive in the thickness direction.

Supplement 15

The pressure-sensitive adhesive sheet according to any one of supplements 11 to 14, wherein the support is a release sheet.

Supplement 16

The pressure-sensitive adhesive sheet according to supplement 15, wherein the support being the release sheet is disposed on each of both surfaces of the pressure-sensitive adhesive layer.

Supplement 17

The pressure-sensitive adhesive sheet according to any one of supplements 11 to 16, wherein the additive is at least one selected from the group consisting of a polymerization initiator, a crosslinking agent, an ultraviolet absorbing agent, a rust inhibitor, and an antistatic agent.

Supplement 18

The pressure-sensitive adhesive sheet according to supplement 17, wherein the additive is at least one selected from the group consisting of a polymerization initiator and a crosslinking agent.

Supplement 19

The pressure-sensitive adhesive sheet according to supplement 18, wherein the additive further comprises an ultraviolet absorbing agent.

Supplement 20

The pressure-sensitive adhesive sheet according to any one of supplements 12 to 19, wherein:
  the base pressure-sensitive adhesive material contains a first polymerization initiator and a first crosslinking agent;
  the curing is curing by a reaction between the first polymerization initiator and the first crosslinking agent; and
  the additive is at least one selected from the group consisting of a second polymerization initiator and a second crosslinking agent.

Supplement 21

The pressure-sensitive adhesive sheet according to supplement 20, wherein the first polymerization initiator is the same as the second polymerization initiator.

Supplement 22

The pressure-sensitive adhesive sheet according to any one of supplements 11 to 21, wherein the pressure-sensitive adhesive layer has a thickness of 5 to 500 μm.

Supplement 23

An optical element laminate comprising:
a substrate comprising an optical element; and
a pressure-sensitive adhesive layer,
wherein:
  the pressure-sensitive adhesive layer is laminated on a principal surface of the substrate comprising an optical element; and
  the pressure-sensitive adhesive layer is a cured product of the pressure-sensitive adhesive layer of the pressure-sensitive adhesive sheet according to any one of supplements 18 to 21.

Supplement 24

The optical element laminate according to supplement 23, wherein:
  the principal surface of the substrate comprising an optical element has a printed layer; and
  the pressure-sensitive adhesive layer is laminated so as to fill up a stepped space between the principal surface of the substrate comprising an optical element and the printed layer.

Supplement 25

The optical element laminate according to supplement 23 or 24, wherein the cured product is a cured product obtained by reaction of at least one selected from the group consisting of the second polymerization initiator and a second crosslinking agent.

INDUSTRIAL APPLICABILITY

The present invention is useful in a method for producing a pressure-sensitive adhesive sheet having a transparent pressure-sensitive adhesive layer that can be used for bonding a transparent optical element to another optical element, and a pressure-sensitive adhesive sheet that can be obtained by the production method.

REFERENCE SIGNS LIST

10 Pressure-sensitive adhesive layer (before curing)
10a Pressure-sensitive adhesive layer (after curing)
S, S1, S2, S3 Support (release sheet)
U Ultraviolet ray
11 Additive
11a Second polymerization initiator
11b Second crosslinking agent
11c Crosslinked structure
12 Solution of additive
13 Solvent
31, 32 Optical element
21 Pressure-sensitive adhesive layer (after curing)
21a Principal surface (first surface) of pressure-sensitive adhesive layer
21b Principal surface (second surface) of pressure-sensitive adhesive layer
41 Pressure-sensitive adhesive layer (before curing)
41a Principal surface (first surface) of pressure-sensitive adhesive layer
41b Principal surface (second surface) of pressure-sensitive adhesive layer
42 Optical element
42a Principal surface of optical element
43 Printed layer

The invention claimed is:

1. A method for producing a pressure-sensitive adhesive sheet, comprising:
  forming a pressure-sensitive adhesive layer formed of a transparent base pressure-sensitive adhesive material on a support;
  curing the pressure-sensitive adhesive layer;
  providing a solution of an additive, wherein the solution of the additive is a solution in which the additive is dissolved in a solvent;
  applying the solution to one of opposite surfaces of the cured pressure-sensitive adhesive layer to cause the additive contained in the solution to infiltrate from the one surface in a thickness direction of the pressure-sensitive adhesive layer; and
  drying the pressure-sensitive adhesive layer,
  wherein the additive is at least one selected from the group consisting of a polymerization initiator, a crosslinking agent, an ultraviolet absorbing agent, a rust inhibitor, and an antistatic agent.

2. The method for producing a pressure-sensitive adhesive sheet according to claim 1, wherein the additive is at least one selected from the group consisting of a polymerization initiator and a crosslinking agent.

3. The method for producing a pressure-sensitive adhesive sheet according to claim 2, wherein the additive further comprises an ultraviolet absorbing agent.

4. The method for producing a pressure-sensitive adhesive sheet according to claim 1, wherein:
- the base pressure-sensitive adhesive material contains a first polymerization initiator and a first crosslinking agent;
- the curing is curing by a reaction between the first polymerization initiator and the first crosslinking agent; and
- the additive is at least one selected from the group consisting of a second polymerization initiator and a second crosslinking agent.

5. The method for producing a pressure-sensitive adhesive sheet according to claim 4, wherein the first polymerization initiator is the same as the second polymerization initiator.

6. The method for producing a pressure-sensitive adhesive sheet according to claim 1, wherein the method comprises drying the pressure-sensitive adhesive layer to evaporate the solvent of the solution.

7. The method for producing a pressure-sensitive adhesive sheet according to claim 1, further comprising laminating a release sheet onto a surface of the pressure-sensitive adhesive layer on a side opposite to the support.

8. A method for producing an optical element laminate, the optical element laminate comprising: a substrate comprising an optical element; and a pressure-sensitive adhesive layer, the method comprising:
- producing a pressure-sensitive adhesive sheet according to claim 4,
- bonding a pressure-sensitive adhesive layer of the pressure-sensitive adhesive sheet to a principal surface of the substrate comprising an optical element; and
- curing the pressure-sensitive adhesive layer by reaction of at least one selected from the group consisting of the second polymerization initiator and the second crosslinking agent.

9. The method for producing an optical element laminate according to claim 8, wherein:
- the principal surface of the substrate comprising an optical element has a printed layer; and
- the pressure-sensitive adhesive layer is bonded so as to fill up a stepped space between the principal surface of the substrate comprising an optical element and the printed layer.

* * * * *